US012283030B1

(12) United States Patent
Mishra

(10) Patent No.: US 12,283,030 B1
(45) Date of Patent: Apr. 22, 2025

(54) OBJECT TRACKING THROUGH ARTIFACTS

(71) Applicant: Armada Systems, Inc., San Francisco, CA (US)

(72) Inventor: Pragyana K. Mishra, Seattle, WA (US)

(73) Assignee: Armada Systems, Inc., San Francisco, CA (US)

(*) Notice: Subject to any disclaimer, the term of this patent is extended or adjusted under 35 U.S.C. 154(b) by 0 days.

(21) Appl. No.: 18/609,822

(22) Filed: Mar. 19, 2024

(51) Int. Cl.
*G06T 5/77* (2024.01)
*G06T 5/50* (2006.01)
*G06T 7/215* (2017.01)
*G06T 7/246* (2017.01)
*G06T 7/73* (2017.01)
*G06T 11/40* (2006.01)
*G06V 10/26* (2022.01)
*G06V 20/40* (2022.01)

(52) U.S. Cl.
CPC .................. *G06T 5/77* (2024.01); *G06T 5/50* (2013.01); *G06T 7/215* (2017.01); *G06T 7/251* (2017.01); *G06T 7/75* (2017.01); *G06T 11/40* (2013.01); *G06V 10/26* (2022.01); *G06V 20/40* (2022.01); *G06T 2207/10016* (2013.01); *G06T 2207/20081* (2013.01)

(58) Field of Classification Search
None
See application file for complete search history.

(56) References Cited

U.S. PATENT DOCUMENTS

| 11,151,798 | B1* | 10/2021 | Casaburo | G06T 7/246 |
| 11,748,940 | B1* | 9/2023 | Xian | G06T 15/205 |
| | | | | 345/419 |
| 11,908,180 | B1* | 2/2024 | Ho | G06T 3/4053 |
| 2022/0058871 | A1* | 2/2022 | Cheng | G06T 7/55 |
| 2023/0070514 | A1* | 3/2023 | Yuan | G06T 5/77 |
| 2023/0206955 | A1* | 6/2023 | Cole | G11B 27/005 |
| | | | | 386/280 |

* cited by examiner

*Primary Examiner* — James A Thompson
(74) *Attorney, Agent, or Firm* — Athorus, PLLC

(57) ABSTRACT

Disclosed are systems and methods to track an object in a scene even when the object is partially or wholly obscured by an artifact, such as another object. As the tracked object moves through the scene, frames of video are processed and used to refine and tune a diffusion model that predicts an appearance of the tracked object in future frames of the video as well as the appearance of artifacts in the frames of the video. Frames of the video may then be enhanced to illustrate the tracked object as if the tracked object were visible through the artifact.

20 Claims, 14 Drawing Sheets

OBJECT TRACKING THROUGH ARTIFACTS

BACKGROUND

In many existing cloud computing architectures, data generated at endpoints (e.g., mobile devices, Internet of Things ("IoT") sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence ("AI") and machine learning ("ML") workloads. For instance, centralized processing models and conventional cloud computing architectures can face constraints in the areas of latency, availability, bandwidth usage, data privacy, network security, and the capacity to process large volumes of data in a timely manner.

For instance, sensor data generated in remote operating environments often cannot be transmitted over conventional fiber optic or other physical/wired internet communication links, based in large part on the lack of such infrastructure in or near the remote operating environment. Consequently, sensor data generated in remote operating environments traditionally must be transmitted over much slower (and often more expensive) wireless communication links, such as cellular and/or satellite communication links.

A satellite communication link with a 25 Megabytes-per-second ("Mbps") upload speed will take approximately 90 hours (approximately four straight days) to transmit 1 terabyte ("TB") of data. However, many remote systems, also referred to herein as edge locations, include cameras and/or sensors that can easily generate in excess of 10 TB of raw data each day. Not only is transmission of the data a problem, storage at the edge location of such large amounts of data is also problematic. Still further, in such remote locations, artifacts, such as rain, smoke, fog, trees, buildings, etc., often occlude or obscure objects that are tracked in video image data from one or more video cameras at the location. With existing systems, when a tracked object in a scene is occluded or obscured with such artifacts, tracking of that object is often hindered or completely eliminated.

DETAILED DESCRIPTION

Figure 1:
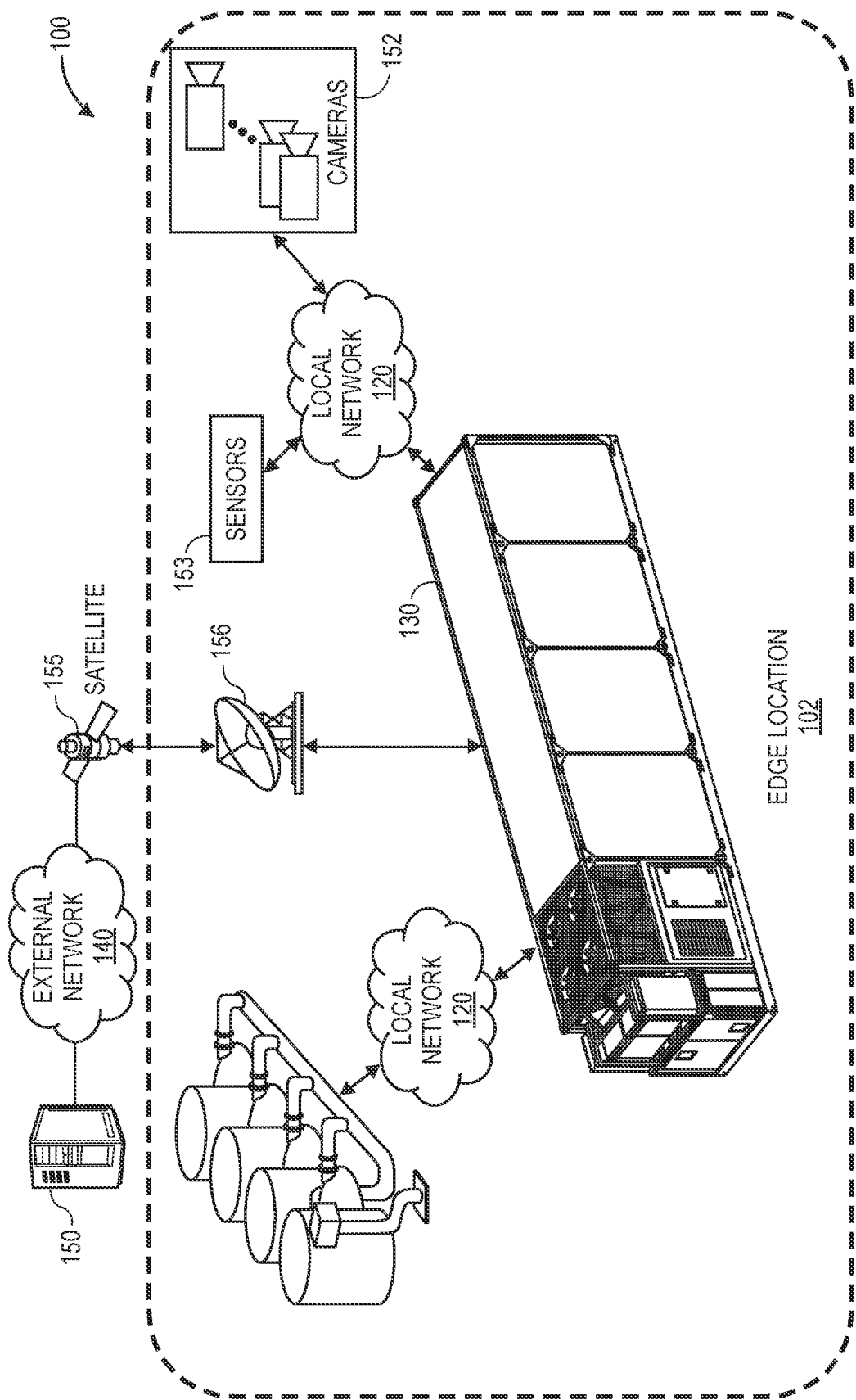
FIG. 1 is an illustration of an edge location with different sensors and cameras and an edge computing apparatus, in accordance with implementations of the present disclosure.

The systems and methods of the present disclosure are directed toward tracking an object in a scene in which the object may be obscured by one or more artifacts as the object moves within the scene. An "artifact," as used herein may be anything that obscures, obstructs or obfuscates, generally referred to herein as obscures, an object in video data generated by one or more imaging devices, such as a camera. For example, an artifact may be a tree, a bush, a building, a vehicle, grass, smoke, fire, water, rain, snow, sleet, hail, or any other solid, liquid, or gaseous substance present in a scene that is recorded as a video/video data by an imaging element. In other examples, the artifact may be present on a lens of the imaging element, such as mud, dirt, water, dust, etc. As will be appreciated, any number and or type of artifacts may be detected in a scene and a tracking of an object within the scene maintained even when the object is partially or totally obscured by the artifact. An "object," as used herein, is any object that is to be tracked in a scene or that is tracked in the scene, whether stationary or moving. For example, an object may be a ground based vehicle, an air based vehicle, a water based vehicle, a human or other animal, or any other substance for which tracking within a scene is desired (e.g., fire, water, lava, oil).

As discussed further below, to enable tracking of an object even when the object is partially or totally obscured by an artifact within a scene included in video data of a video generated by an imaging element that has a field of view of the scene, a model, such as a diffusion model and/or an active appearance model ("AAM"), is trained or refined in real-time or near real-time to track the object within the scene. For example, when an object to be tracked first enters a scene, one or more frames of the video in which the object is not obscured may be determined, referred to herein as an unobscured frame and used to train or refine the model to detect and track the object in the video of the scene while the object moves within the scene. Likewise, one or more frames of the video in which the object is at least partially obscured by an artifact may be determined, referred to herein as an obscured frame, and used with the unobscured frame(s) to train or refine the model to both predict the position and/or pose of the object within the scene and to predict the position and/or pose of artifacts within the scene.

As the object moves and is tracked within the scene, the model may be continually or periodically refined to improve the tracking of the object within the scene. For example, the model may determine a predicted position and/or predicted pose of the object in one or more next frames and as those frames a generated, a difference between the predicted position and/or predicted pose of the object and the actual position and/or actual pose of the object determined and used to refine the model. Likewise, as additional unobscured frames and obscured frames are detected, those unobscured frames and obscured frames may also be used to continually refine the model.

As the model is refined to learn the position and/or pose of artifacts in the scene, tracking of the object or other objects is continually improved. For example, as the model tracks a first object and is refined based on the movement of a first object through the scene, the model learns the position of artifacts within the scene as frames of the video of the scene are processed and the object is obscured by those artifacts. When a second object to be tracked enters the scene, the model may utilize the knowledge of the position of the artifacts within the scene, along with unobscured frames of the second object to predict a position and/or pose of the second object when the second object is obscured by one or more artifacts within the scene.

In some implementations, as a tracked object moves within the scene and becomes at least partially obscured by an artifact, the predicted position and/or pose of at least a portion of the object that is obscured by the artifact may be determined and pixels of one or more frames of the video determined that correspond to the predicted position and/or pose of the portion of the object that is obscured. The determined pixels may then be infilled with pixel values corresponding to the portion of the object that is obscured by the artifact to generate an enhanced object tracking frame such that the object appears visible through the artifact. In some implementations, the pixel values may be infilled so that a silhouette of the predicted pose and/or position of the object is presented and visible through the artifact. In other implementations, the values may be infilled such that the predicted pose and/or position of the object is presented and visible through the artifact as if the artifact is at least partially translucent or at least partially transparent. In still other examples, the pixel values may be infilled such that the predicted pose and position of the object is presented and visible through the artifact as if the artifact was not present. The enhanced object tracking frame, along with other frames of the video may then be presented to an operator, stored, processed with other systems, or otherwise utilized to maintain the tracking of the object within the scene.

In some implementations, in addition to or as an alternative to generating enhanced object tracking frames that allow tracking and visibility of an object when the object is obscured by an artifact, the disclosed implementations, may be used to continually update frames of a video to remove the artifact from the video data such that the scene appears as if the artifact were not present. For example, if an imaging element that is generating video data of the scene includes an artifact on the lens of the imaging element, such as mud, dirt, dust, raindrop, etc., each frame of the video may be updated such that the portion of the scene that would otherwise be obscured by the artifact is presented as if the artifact were not present. For example, pixel values of pixels surrounding pixels of the portion of the scene that are obscured by the artifact may be utilized to infill the pixels that are obscured such that frames of the scene are presented as if the artifact were not present on the lens of the imaging element. Other infilling techniques are discussed further below.

In some implementations, the systems and methods discussed herein rely on trained machine learning models operating on edge computing units that are in the form of ruggedized, autonomous systems that may be deployed to harsh environments with limited or unreliable power or network connectivity. The machine learning models may be trained using domain-specific information or data, which may be structured or unstructured in nature, and may be configured to generate enhanced image data and/or frames, each of which may be generated at a local site or in an edge location with minimal latency. Video data and/or other sensor data may be received from cameras and/or other sensors, at the edge location, such as microphones, meters, gauges, etc., and processed at the edge location in accordance with the disclosed implementations.

Referring to FIG. 1, illustrated is a view of an edge location with different sensors and cameras and an edge computing apparatus, in accordance with disclosed implementations.

As is shown in FIG. 1, a system 100 includes an edge location 102 and an edge computing unit 130 provided in association with the edge location 102. The edge computing unit 130 may be in communication with any number of devices or systems at the local site 102 over a local network 120, and also with any number of devices or systems, e.g., an external processing system 150, over an external network 140 that may include the Internet in whole or in part. In particular, as is shown in FIG. 1, the edge computing unit 130 may access the external network 140 or the external processing system 150 by way of one or more satellite dishes 156 at the edge location 102 with one or more satellites 155, which may provide a backhaul connection with the external network 140.

The edge location 102 shown in FIG. 1 may be any type of location at which remote computing is necessary or desirable. For example, and not by way of limitations, the edge location may be a desalination plant, e.g., a facility at which salt or other minerals are removed from water, an oil refinery, a stadium, a warehouse, a geological excavation site, a military outpost, a property line, state border, country border, etc. Alternatively, or additionally, the edge location 102 may be any other facility or location at which humans may engage in one or more operations, such as an agricultural site (e.g., a farm), an industrial site (e.g., a plant or factory), a tourist attraction (e.g., a remote hotel or park), or any other site. In some implementations, the edge location 102 may be a location where power or network connectivity from traditional power grids or other sources, e.g., alternating current ("AC") power in any number of phases and at any frequency or voltage, or direct current ("DC") power at any voltage, are limited or unavailable at one or more times during any given day. Moreover, in some implementations, the local site 102 may include any number of assets, such as systems or components for capturing or sensing information or data, e.g., cameras or other sensors, as well as vehicles of any type or form, which may be manned or unmanned.

The edge computing unit 130 may be a computer system that includes any number of servers, processors, data stores, transceivers, switches, or other computer components or systems, as well as any number of power units, environmental control systems, isolation systems, or systems. Power units of the edge computing unit 130 may include any number of batteries, diesel engines, solar panels, or other power sources. Environmental control systems of the edge computing unit 130 may include any number of heating units, air conditioning units, fans, dampers, valves, humidifiers, dehumidifiers, or other systems for controlling environmental conditions within or around the edge computing unit 130. Isolation systems of the edge computing unit 130 may include any number of components for isolating internal portions of the edge computing unit 130 from an external environment at the local site 102, and may form or define chambers having any number of covers, sides, bottoms, doors, or other components formed from any suitable materials. Alternatively, or additionally, the edge computing unit 130 may include any number of other components or systems.

Components of the edge computing unit 130 may be provided in a housing, such as a containerized unit, that is configured to maintain such components at desired temperatures, pressures, humidity levels or others, while protecting such components against the elements or any other adverse conditions at the local site 102. The edge computing unit 130 may have been transported to the local site 102 by one or more external propulsion units, e.g., aircraft, road tractors, ships, trailers or trains, or others, and may include one or more motors or other systems for reorienting or repositioning itself at the local site 102.

The local network 120 may include any number of networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols. For example, in some implementations, the local network 120 may include any number of access points, switches, routers or other components that may be configured to enable the exchange of information or data between one or more sensors, devices or other assets provided at the local site 102 and the edge computing unit 130 over any number of systems or protocols.

The external network 140 may be any wired network, wireless network, or combination thereof, and may comprise the Internet in whole or in part. In addition, the external network 140 may be a personal area network, local area network, wide area network, cable network, satellite network, cellular telephone network, or combination thereof. The external network 140 may also be a publicly accessible network of linked networks, possibly operated by various distinct parties, such as the Internet. In some embodiments, the external network 140 may be a private or semi-private network, such as a corporate or university intranet. The external network 140 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and need not be described in more detail herein.

Any combination of networks or communications protocols may be utilized by the local network 120 or the external network 140 in accordance with the systems and methods of the present disclosure. For example, devices or systems connected to the local network 120 or the external network 140 described herein may be configured to communicate via an open or standard protocol such as Wi-Fi. Alternatively, devices or systems connected to the local network 120 or the external network 140 may be configured to communicate with one another directly outside of a centralized network, e.g., by a wireless protocol such as Bluetooth®, in which two or more of such components may be paired with one another.

The external processing system 150 may include any number of physical computer servers having one or more computer processors and any number of data stores (e.g., databases) associated therewith, as well as being provided for any specific or general purpose. For example, the external processing system 150 may be independently provided for the exclusive purpose of receiving, analyzing or storing information or data received from the edge computing unit 130 or, alternatively, provided in connection with one or more physical or virtual services that are configured to receive, analyze or store such information or data, as well as to perform one or more other functions. In some implementations, the external processing system 150 may be provided in a physical location. In other such implementations, the external processing system 150 may be provided in one or more alternate or virtual locations, e.g., in a "cloud"-based environment.

The satellite 155 may be any system that is configured to relay signals containing information or data between two or more computer devices or systems while orbiting the Earth. For example, the satellite 155 may be a portion of a propagation path of a communication link between two or more computer devices or systems that orbits the Earth. Alternatively, or additionally, the satellite 155 may be any other airborne or spaceborne device or system, e.g., an airliner, a drone, or a balloon, that may but need not travel in outer space or orbit the Earth to relay signals between the edge computing unit 130 and the external network 140 or the external processing system 150.

Although only a single satellite 155 is shown in FIG. 1, the edge computing unit 130 may be configured to communicate with the external network 140, or any external processing systems 150, by way of any number of satellites 155. Moreover, in some implementations, the edge computing unit 130 may be configured to communicate with the external network 140 by the transmission or receipt of data by any other means or techniques other than the satellite 155.

As discussed herein, video data generated by the one or more cameras 152 of the edge location 102 may be processed to track objects moving within the video, even when those objects are partially or fully obscured by one or more artifacts. Likewise, in some implementations, sensor data generated by the one or more sensors 153 of the edge location 102 may also be processed to provide tracking related information and/or generate a text-based sensor narrative that describes the sensor data collected by the one or more sensors. In some implementations, the object tracking information, enhanced object tracking frames of video data, and/or the unaltered video data may be stored to supplement or replace (in whole or in part) the video data and/or the sensor data. Still further, in some implementations, the video data with the enhanced object tracking frames and/or other enhanced frames to remove unwanted artifacts may be transmitted to the external processing system 150, processed by other systems, etc.

Accordingly, the systems and methods of the present disclosure may be used to track objects moving within a scene that is recorded in video/video data by one or more cameras, even when the object is partially or fully obscured by one or more artifacts. Likewise, the video data may be enhanced to illustrate the tracked object when the tracked object is partially or fully obscured by an artifact, as if the artifact was partially transparent, partially translucent, or as if the artifact was not present in the scene, such that the tracked object remains visible in the video data.

While the following examples focus primarily on tracking a vehicle as the vehicle moves within a scene and enhancing frames of the video so that the vehicle remains present even when partially or fully obscured by an artifact, it will be appreciated that the disclosed implementations are equally applicable to tracking any type of moving or stationary object within a scene that is recorded as video/video data and/or images by one or more cameras. For example, the disclosed implementations may also be used to track humans or other animals, fire, water, lava, etc., and to generate enhanced video that illustrates the tracked object as visible in the video even when the tracked object is partially or fully obscured by an artifact. In addition, while the disclosed implementations are primarily discussed with respect to color images and video, the disclosed implementations are equally applicable to any form of still or video including, but not limited to, thermal imaging and video, infrared imaging and video, two-dimensional imaging and video, three-dimensional imaging and video, hyper spectrum imaging and video, Forward Looking Infrared ("FLIR") imaging and video, etc.

Edge computing units 130 of the present disclosure may have any size or shape, and take any form. In some implementations, edge computing units 130 may be provided in standardized containers, thereby enabling such units to be rapidly transported to any location by a single mode or in an intermodal fashion, e.g., by air, sea or land, and positioned in place using standard equipment such as cranes, forklifts, or other machinery. The edge computing units 130 may contain or have ready access to critical infrastructure such as power, climate control systems, security features, fire protection systems or access control systems. The edge computing units 130 may also include integrated hardware components and software applications programmed thereon prior to deployment, such that the edge computing units may be activated and placed into service following installation without delay.

Edge computing units 130 of the present disclosure may further include sufficient power for sustaining operations of such units, and ensuring redundancy even during downtime such as maintenance, updating or repairs. The edge computing units 130 may operate based on alternating current ("AC") electrical power, direct current ("DC") electrical power, or power from any other source. In some implementations, the edge computing units may operate on 480 volt, three-phase, 60 Hertz AC power. In some other implementations, the edge computing units 130 may be configured for operation on 220 to 230 volt, single-phase AC power at any frequency. Alternatively, the edge computing units may operate using AC power or DC power at any voltage, power level or frequency.

Edge computing units 130 of the present disclosure may also include any number of servers or other computer devices or systems, as may be required in order to execute any desired applications or perform any desired functions. In some implementations, the edge computing units 130 may include server racks that are isolated or otherwise configured for resistance against shocks or vibrations during transportation and/or operations.

Edge computing units 130 may be operated independently or as members of groups (e.g., a fleet of such units), and may communicate over local networks 120 at local sites where the edge computing units are employed, e.g., via short-range wired or wireless networks, or over backhaul links to the Internet or other computer networks via wired, wireless or satellite connections. The edge computing units 130 may be programmed with software applications for overseeing operations at a local site, as well as power, data transmission and connectivity of the edge computing units, for simplifying the deployment and management of applications with asset-aware resource provisioning, for managing workloads deployed to edge computing units or other assets at local sites with automatic resource provisioning, job assignment or cancellation features, and for maintaining security and access controls for the edge computing units and other assets.

Figure 2A:
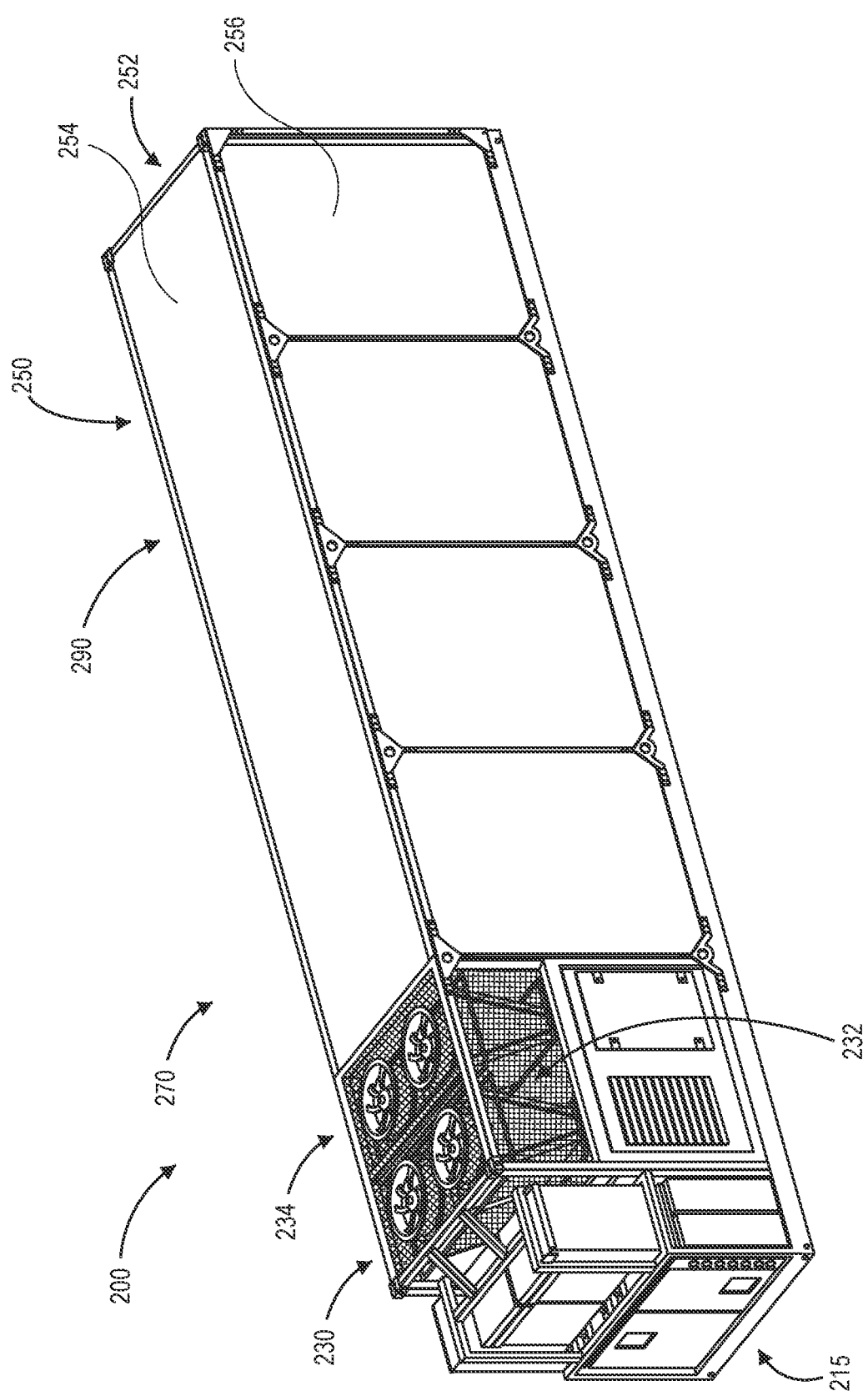
FIGS. 2A and 2B are example illustrations of an edge computing apparatus, in accordance with disclosed implementations.
Figure 2B:
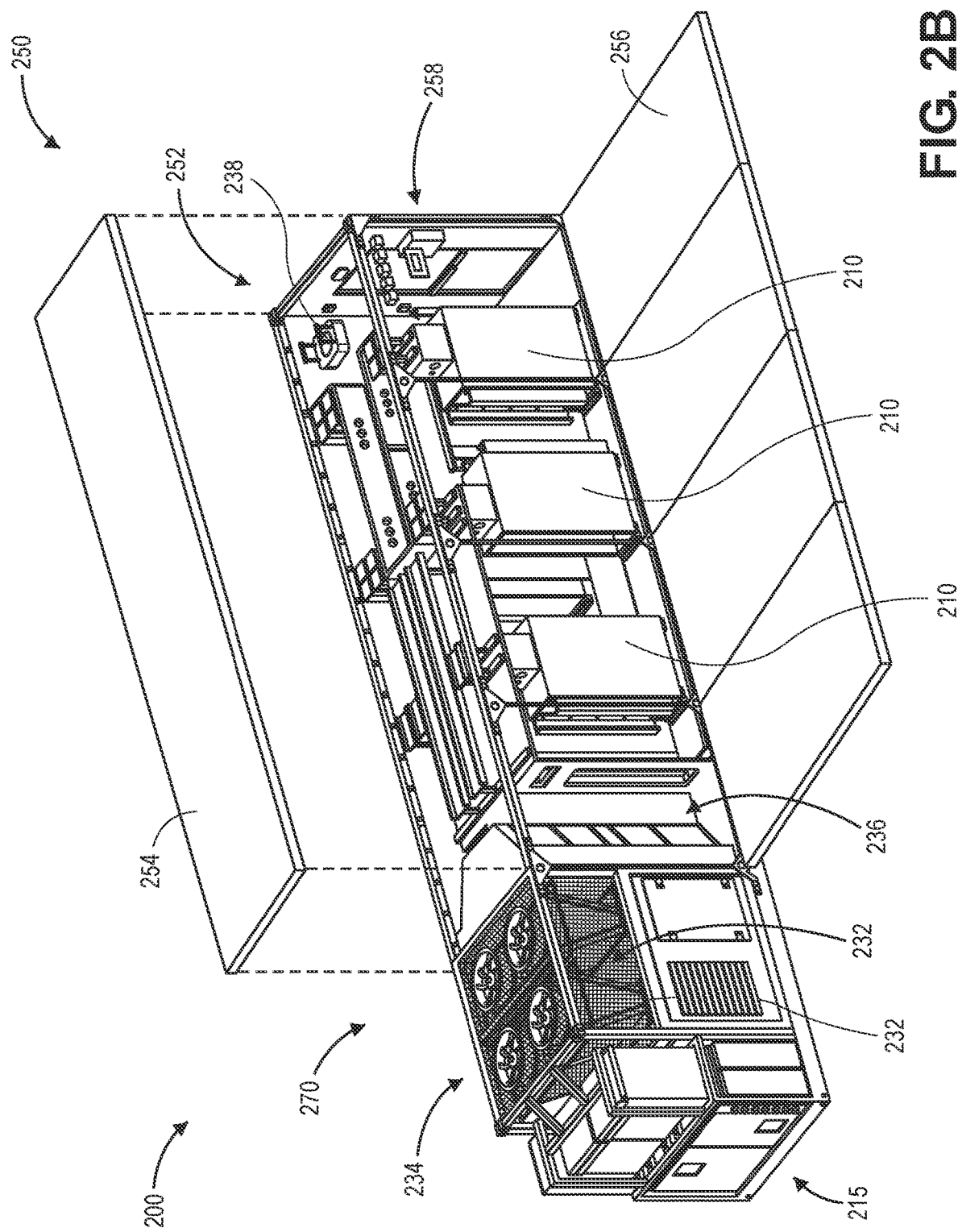

Edge computing units 130 of the present disclosure may have any size, shape or dimensions, and may include any number of components or systems. Referring to FIGS. 2A and 2B, an edge computing apparatus 200 of the present disclosure is shown. As is shown in FIGS. 2A and 2B, the edge computing apparatus 200 comprises a plurality of server racks 210, a plurality of power units 215, a plurality of environmental control systems 230 and an isolation system 250 disposed in a housing 270 having a form of a containerized unit 290. The edge computing apparatus 200 may be deployed to particular sites or locations, which may be referred to herein as "local sites" or "edge locations," using one or more external propulsion units such as aircraft, road tractors, ships, trailers, trains, or others, which may be configured to lift, carry or otherwise transport the edge computing apparatus 200 to such locations, e.g., over substantially long distances. Alternatively, the edge computing apparatus 200 may further include propulsion units that are integrated with the edge computing apparatus 200, such as motors, engines, drive train components, transmissions, axles, wheels or other features. For example, in some implementations, the edge computing apparatus 200 may be an integral component of a road tractor, a trailer or a train. In some implementations, the edge computing apparatus 200 may further include one or more internal propulsion systems, e.g., electrical motors, which may be used to subsequently move or relocate the edge computing apparatus 200 for short distances upon an arrival at a local site or an edge location.

The server racks 210 may include any number of computing components, units or systems. For example, in some implementations, each of the server racks may include one or more central processing units, as well as data stores or other memory components, networking systems, power supplies, high-performance computing units, e.g., graphical processing units, field programmable gate arrays, vision processing units, associative processing units, tensor processing units, neuromorphic chips, quantum processing units, or the like. Numbers of the respective processor units or other components within each of the server racks 210 may be selected for redundancy or for resiliency, or on any other basis. Moreover, the networking systems may include one or more routers, networking switches, out-of-band switches, or systems for communication between the respective server racks 210 or any number of components of the edge computing apparatus 200 within the housing 270, or for communication with any number of external systems (not shown).

The edge computing apparatus 200 may further include one or more power units 215, which may include any number of components for generating or storing energy in any form. For example, in some implementations, the power units 215 may include any number of batteries or other power cells, e.g., dry cell or wet cell batteries such as lead-acid batteries, lithium-ion batteries, nickel cadmium batteries or nickel metal hydride batteries, or any other type, size or form of batteries. In some implementations, the power units 215 may further include one or more diesel engines, electric engines, or engines or motors that are powered by any other source of energy, e.g., gasoline, natural gas, fuel cells, nuclear reactors, solar power, or others. The power units 215 of the edge computing apparatus 200 may be selected on any basis, such as their respective peak or mean voltages, peak or mean load currents, charge times, fuel capacities, or other attributes.

In some implementations, the power units 215 may be coupled to one or more solar panel arrays that are included in, coupled to, or otherwise associated with surfaces of the edge computing unit 200. For example, solar panel arrays may be attached to a top surface of the housing 270, or in any other portion of the housing 270. The solar panel arrays may be fixed in position, or foldable, collapsible, or otherwise movable between deployed and stowed positions, and exposed in order to generate electrical power using sunlight incident upon surfaces of the solar panel arrays. Electrical power generated by solar panel arrays may be transferred to the power units 215 and used to power the edge computing unit 200 and its constituent components.

The edge computing apparatus 200 may further include one or more environmental control systems 230 in order to maintain or establish a desired set of environmental conditions (e.g., temperature, pressure, humidity, or others) within the edge computing apparatus 200. For example, the environmental control systems 230 may include, but need not be limited to, one or more air conditioning units 232, fans 234, dampers 236 and heaters 238. The air conditioning units 232 may be formed from metals, plastics or other suitable materials and include any number of compressors, condensers, evaporators or other systems for maintaining or reducing air temperatures within the edge computing apparatus 200. The environmental control systems 230 may include any number of fans 234 for initiating air flows into the air conditioning units 232 or throughout the housing 270. The environmental control systems 230 may also include one or more dampers 236 for initiating, isolating or regulating flows of air into, throughout or out of the edge computing apparatus 200. The environmental control systems 230 may further include one or more heaters 238 of any type or form, e.g., electric, gas, kerosene, propane, or others, which may include any number of systems for maintaining or increasing air temperatures within the edge computing apparatus 200.

The environmental control systems 230 shown in FIGS. 2A and 2B are integral to the edge computing apparatus 200. Alternatively, or additionally, the edge computing system 200 may include any number of other environmental control systems (not shown) that operate in a standalone manner, external to the edge computing apparatus 200, in order to maintain or establish a desired set of environmental conditions within the edge computing apparatus 200.

As is shown in FIGS. 2A and 2B, the edge computing apparatus 200 may further include an isolation system 250 for isolating internal portions of the edge computing apparatus 200 from an external environment. The isolation system 250 may include a chamber 252 defined by a top cover 254, a plurality of sides 256 and a door 258.

The isolation system 250 may be configured to secure contents of the edge computing apparatus 200, e.g., the server racks 210 or others, and to protect such contents from the elements while also restricting unauthorized access or entry into the chamber 252. For example, the isolation system 250 may be closed and sealed to maintain the chamber 252 in any desired condition, e.g., at selected levels of temperature, pressure and humidity, and access to the chamber 252 may be provided by way of the door 258 following the operation of one or more access control systems, e.g., any remotely activated locking systems for such doors or other portals. Components of the isolation system 250 may have any quality, strength or security ratings. Furthermore, materials from which the cover 254, the sides 256 or the door 258 are formed or constructed may be selected to further provide radiofrequency shielding or to serve other protective functions for contents of the chamber 252.

Components of the isolation system 250 may also serve one or more other purposes, in addition to enclosing and securing portions of the edge computing apparatus 200 contents of the chamber 252 therein. For example, portions of the isolation system 250 may also provide structural support to the housing 270 or any other portions of the edge computing apparatus 200.

The housing 270 may have any size or shape, and may take any form. In some implementations, the housing 270 may be a shipping container, or a similar vessel, of any standard shape or length. For example, in some implementations, the housing 270 may be a 40-foot vented shipping container constructed from steel and having one or more steel frames and/or castings that are sufficiently durable and strong enough to accommodate cargo, and to withstand impacts due to stacking, shocks or other contact during normal operation. In other implementations, the housing 270 may be made from a non-steel material, which may be appropriate where the containerized units 290 are deployed across wide geographical areas and need not be stacked, enabling lighter and more cost-effective materials other than steel to be used to form the housing 270. Additionally, in some implementations, the housing 270 may take the form of an intermodal container having standard dimensions including widths of approximately eight to eight-and-one-half feet (8 to 8.5 ft) and lengths of twenty, forty, forty-five, forty-eight or fifty-three feet (20, 40, 45, 48 or 53 feet) and heights of approximately eight to ten feet (8 to 10 ft), typically eight-and-one-half or nine-and-one-half feet (8.5 or 9.5 ft).

Implementations of the present disclosure may be operated, performed or executed by any type or form of computing device, apparatus or system, and need not be limited to the edge computing apparatus 200 of FIGS. 2A and 2B. Such devices, apparatuses or systems may include, but need not be limited to, cameras, mobile devices (e.g., smartphones, tablet computers, or the like), desktop computers, laptop computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Figure 3A:
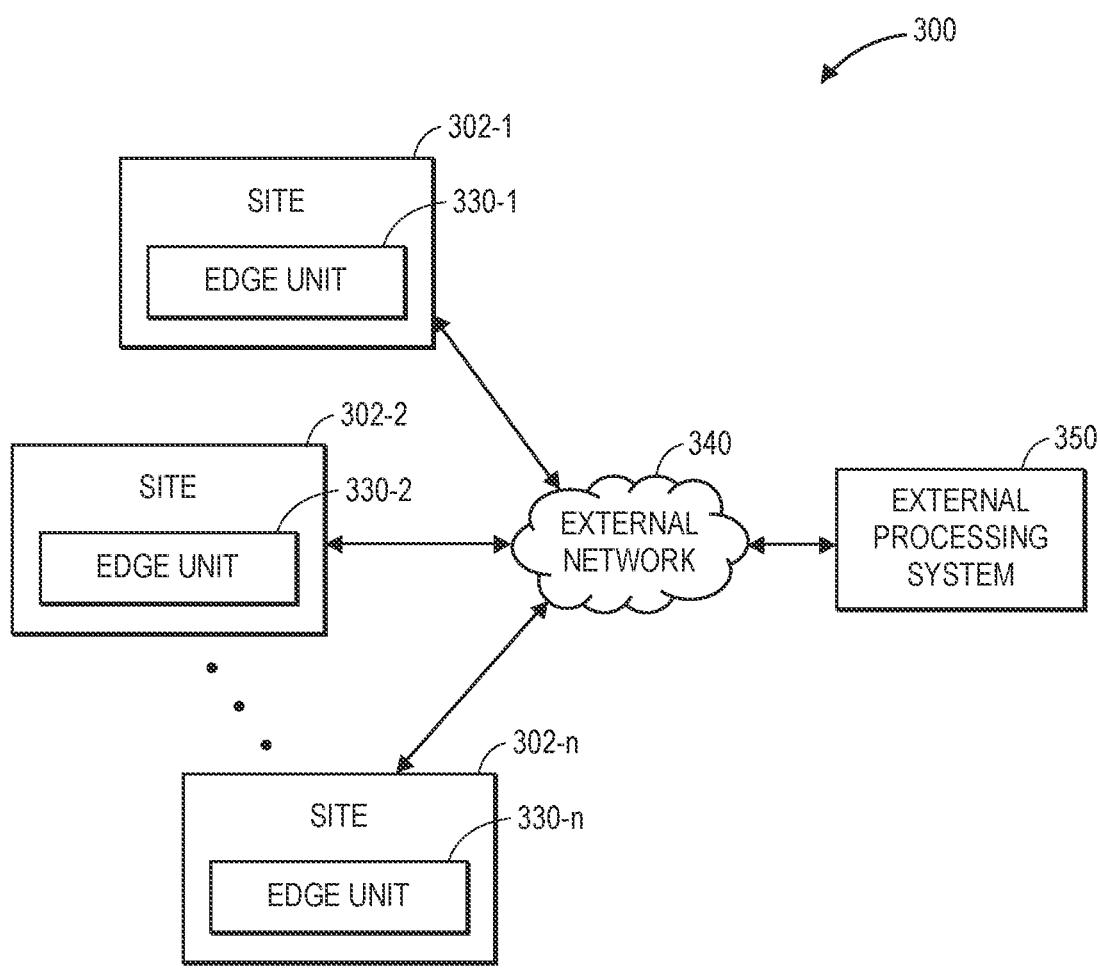
FIGS. 3A and 3B are block diagrams of an example system, in accordance with disclosed implementations.
Figure 3B:
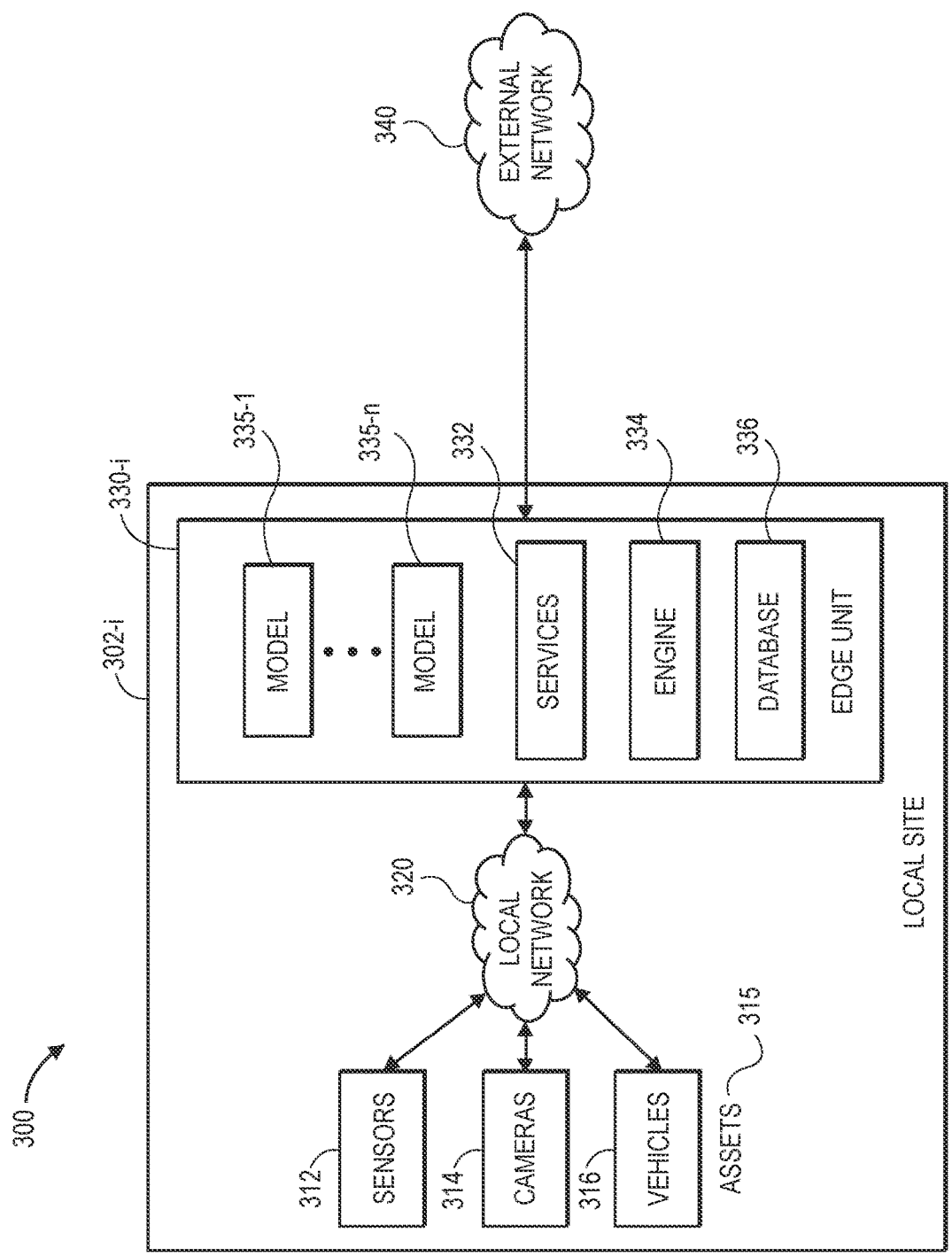

Edge computing apparatuses may be provided at any site or location and in any number, and may be connected to one another or any external systems over one or more external networks. Referring to FIGS. 3A and 3B, block diagrams of one system 300 in accordance with implementations of the present disclosure are shown.

As is shown in FIG. 3A, the edge computing system 300 includes a plurality of edge computing units (or systems) 330-1, 330-2 . . . 330-$n$ and an external processing system 350. The plurality of edge computing units 330-1, 330-2 . . . 330-$n$ are distributed at various local sites 302-1, 302-2 . . . 302-$n$, which may also be referred to herein as "edge locations," and connected to one another and the external processing system 350 over an external network 340, which may include the Internet in whole or in part. Each of the sites 302-1, 302-2 . . . 302-$n$ may include any number of edge computing units 330-1, 330-2 . . . 330-$n$.

As is shown in FIG. 3B, a representative of one of the sites 302-1, 302-2 . . . 302-$n$ including a representative one of the edge computing units 330-1, 330-2 . . . 330-$n$ is shown. The edge computing unit 330-$i$ may be used to implement or perform one or more aspects of the present disclosure. The edge computing unit 330-$i$ may also be referred to as an "edge device" or an "edge compute unit." In some implementations, the edge computing unit 330-$i$ may be provided as a high-performance compute and storage ("HPCS") and/or elastic-HPCS ("E-HPCS") edge device. As is further shown in FIG. 3B, the edge computing unit 330-$i$ may be in communication with any number of assets 315 at the site 302-$i$, including one or more sensors 312, one or more cameras 314, and one or more vehicles 316, or others, and may transmit information or data to such assets 315, or receive information or data from such assets 315, during operations of such assets 315 at the site 302-$i$, over one or more local networks 320. Such local networks 320 may include, but need not be limited to, one or more networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols.

The site 302-$i$ may be any one of a plurality of environments or deployment locations associated with the edge computing unit 330-$i$. The site 302-$i$ may be a geographic location or area associated with an enterprise user (or another user) of edge computing, or an edge location in a data network topography in terms of data network connectivity. Alternatively, or additionally, the site 302-$i$ may be both a geographic location of an enterprise user and an edge location in the data network topography.

The edge computing unit 330-$i$ may be configured as a containerized edge compute unit or data center for implementing sensor data generation or ingestion and inference for one or more trained machine learning or artificial intelligence models provided thereon. For instance, the edge computing unit 330-$i$ may include computational hardware components configured to perform inference for one or more trained machine learning or artificial intelligence models. As is shown in FIG. 3B, one portion of the edge computing unit 330-$i$ may include hardware resources associated with or used to implement a first model 335-1, while another portion of the edge computing unit 330-$i$ may include hardware resources associated with or used to implement an n-th model 335-$n$, where n may be any number of different machine learning or artificial intelligence models that may be operated simultaneously or in parallel. The model or models executing by the edge computing unit 330-$i$ may also be referred to herein as an "edge model" or "edge models."

In some cases, the system 300 may utilize the edge computing systems 330-1, 330-2 . . . 330-$n$ provided at one or more of the sites 302-1, 302-2 . . . 302-$n$ to capture and process information or data received locally via the local networks 320, e.g., from any of the assets 315, and transmit the data to one or more external processing systems 350 over one or more external networks 340.

The local network 320 may provide any number of communication links between the edge computing system 330-$i$ and respective ones of the assets 315. In some implementations, one or more aspects of the local network 320 may be implemented as a private or public "5G" network, "4G" network, "Long-Term Evolution" network, or other cellular network. Alternatively, or additionally, one or more aspects of the local network 320 may be implemented as a Wireless-Fidelity (or "Wi-Fi") network, a Bluetooth® network, a Zigbee network, a Z-wave network, a Long Range (or "LoRa") network, a Sigfox network, a Narrowband Internet of Things (or "NB-IoT") network, or any other short-range wireless network.

The edge computing unit 330-$i$ may receive different types of information or data from any number of the assets 315, and may transmit any type of information or data received from such assets 315 to any number of external processing systems 350. For example, in some implementations, the edge computing unit 330-$i$ may receive streams of information or data from any of the sensors 312, which may include but need not be limited to one or more position sensors (e.g., Global Positioning Satellite system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 312 may also include any number of memory or storage components and processors, photosensitive surfaces, filters, chips, electrodes, clocks, boards, timers or any other relevant features (not shown) for aiding in their operation.

In some implementations, the edge computing unit 330-$i$ may also receive streams of information or data from any of the cameras 314, which may include imaging devices of any type or form, e.g., digital cameras, depth sensors or range cameras, infrared cameras, radiographic cameras or other optical sensors. The cameras 314 may be configured to photograph or otherwise capture visual information or data (e.g., still or moving images in color or black and white that may be captured at any frame rates, or depth imaging data such as ranges), or associated audio information or data, or metadata, regarding objects or activities occurring at the site 302-$i$, or for any other purpose.

For example, the cameras 314 may be configured to capture or detect reflected light if the reflected light is within fields of view of the cameras 314, which may be defined as a function of a distance between an imaging sensor and a lens within one of the cameras 314, viz., a focal length, as well as positions of the cameras 314 and angular orientations of their respective lenses. The cameras 314 may further include manual or automatic features for modifying a field of view or orientation. For example, one or more of the cameras 314 may be configured in a fixed position, or with a fixed focal length (e.g., fixed-focus lenses) or angular orientation. Alternatively, one or more of the cameras 314 may be configured with actuated or motorized features for adjusting a position, a focal length (e.g., zooming the imaging device) or an angular orientation (e.g., the roll angle, the pitch angle or the yaw angle), by causing a change in a distance between the imaging sensor and the lens (e.g., optical zoom lenses or digital zoom lenses), a change in a position of the cameras 314, or a change in one or more of the angles defining the angular orientation of the cameras 314.

In some implementations, one or more of the cameras 314 may be an imaging device that is hard-mounted to a support or mounting that maintains the cameras 314 in a fixed configuration or angle with respect to one, two or three axes. Alternatively, one or more of the cameras 314 may be provided with one or more motors and/or controllers for manually or automatically operating one or more of the components, or for reorienting the axis or direction of the cameras 314, i.e., by panning or tilting the cameras 314. Panning the cameras 314 may cause a rotation within a horizontal plane or about a vertical axis (e.g., a yaw), while tilting the cameras 314 may cause a rotation within a vertical plane or about a horizontal axis (e.g., a pitch). Additionally, one or more of the cameras 314 may be rolled, or rotated about its axis of rotation, and within a plane that is perpendicular to the axis of rotation and substantially parallel to a field of view of the cameras 314.

In some implementations, the edge computing unit 330-$i$ may also receive streams of information or data from any of the vehicles 316, which may include, but need not be limited to, one or more autonomous ground vehicles, one or more autonomous aerial vehicles (e.g., drones), or any other vehicle of any type, such as cars, trucks, trailers, freight cars, container ships or aircraft, which may be manned or unmanned (e.g., drones). Such vehicles 316 may be outfitted with any number of the sensors 312 or the cameras 314 described herein.

The vehicles 316 may receive information or data of any type or form from the edge computing unit 330-$i$, and transmit information or data of any type or form to the edge computing unit 330-$i$. The vehicles 316 may also receive information or data of any type or form from the edge computing unit 330-$i$, and transmit information or data of any type or form to the assets 315, e.g., the sensors 312 or the cameras 314. For example, in some implementations, the edge computing unit 330-$i$ may provide information or data regarding any number of configurations or controls to the assets 315. In some other implementations, the edge computing unit 330-$i$ may receive onboard camera feed and other sensor information, e.g., 3D range scanner, LiDAR, or odometry information for Simultaneous Localization and Mapping (or "SLAM"), from the vehicles 316, and may transmit any number of instructions to the vehicles 316.

Additionally, in some implementations, the edge computing unit 330-$i$ may be further utilized to execute one or more sets of instructions for locally storing information or data, executing one or more of the models 335-1 . . . 335-$n$, e.g., for inference, predictions or responses, or performing any other tasks or functions at the edge computing unit 330-$i$, with limited to no reliance on any external processing systems 350, e.g., in the "cloud." For example, the edge computing unit 330-$i$ may also be used to perform inference or generate predictions locally, e.g., by executing one or more of the trained or pretrained machine learning or artificial intelligence models 335-1 . . . 335-$n$ that may be received from any external processing systems 350 or any other edge computing units.

Results or predictions generated by the models 335-1 . . . 335-$n$ may be compressed and periodically uploaded by the edge computing unit 330-$i$ to external processing systems 350, e.g., in the "cloud," over the external network 340, which may include a satellite network configured to provide wireless satellite connectivity between the edge computing unit 330-$i$ at the site 302-$i$ and existing network infrastructure. Such results or predictions may be included in batch uploads transmitted over the external network 340, which may act as an Internet backhaul link, to any number of external processing systems 350. Additionally, in some implementations, results or predictions may be utilized immediately at the edge computing unit 330-$i$, and transmitted in compressed form to the external processing systems 350, e.g., in the "cloud," at a later time. For example, the external network 340 may be used to provide periodic transmission or upload of compressed prediction or inference results, e.g., during high-bandwidth or low-cost availability hours associated with the external network 340.

In some implementations, results or predictions may be obtained by performing one or more essential functions or tasks using the models 335-1 . . . 335-$n$, while offloading more computationally intensive and/or less time-sensitive tasks from the edge computing unit 330-$i$ to other machine learning or artificial models executed by one or more external processing systems 350, e.g., in the "cloud." For example, in some implementations, machine learning or artificial intelligence models operated by remote computing systems, e.g., the external processing systems 350, may be utilized to train or fine-tune one or more of the models 335-1 . . . 335-$n$, and updated versions of such models may be transmitted to the edge computing unit 330-$i$ over the external networks 340, e.g., via a network backhaul. In some implementations, the models 335-1 . . . 335-$n$ may be trained, fine-tuned, retrained or replaced in an iterative or continuous manner. For example, in some implementations, the edge computing unit 330-$i$ may be configured to perform scheduled or periodic downloads or updates of the models 335-1 . . . 335-$n$ based on information or data received from the external processing systems 350. Downloads or updates of the models 335-1 . . . 335-$n$ may be distributed to the edge computing unit 330-$i$ in a "push" fashion, whereby the external processing systems 350 transmit updated or models to edge computing unit 330-$i$ over the external networks 340, e.g., via a network backhaul, as updated or new models become available.

The edge computing unit 330-$i$ may further include any number of services 332 for executing or operating with any external processing systems 350, e.g., in the "cloud," as well as an engine 334 (e.g., a high-performance compute engine) for implementing or managing the models 335-1 . . . 335-$n$, and one or more databases (e.g., data stores) 336 for maintaining information or data of any type or form thereon.

Figure 4:
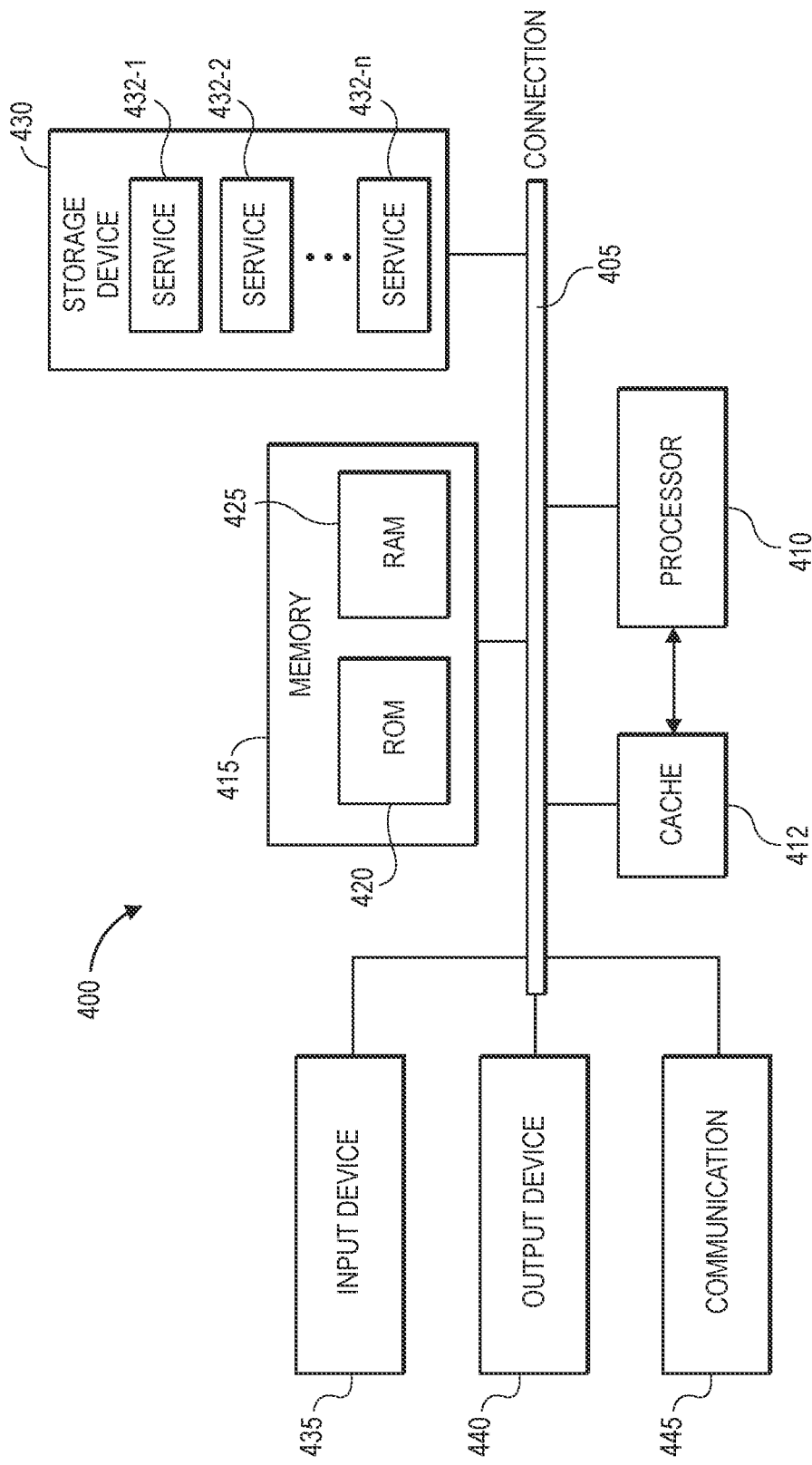
FIG. 4 is an example computing device architecture, in accordance with disclosed implementations.

Components of computing devices or systems described herein may be arranged or configured in any number of discrete architectures. Referring to FIG. 4, a computing device architecture 400 of the present disclosure is shown. In some examples, the computing device architecture 400 may be provided on an edge computing unit, such as the edge computing apparatuses 200 of FIGS. 2A and 2B, the edge computing units 330-*i*, 330-1, 330-2 . . . 330-*n* of FIGS. 3A and 3B, or any other edge computing apparatuses or units. Alternatively, or additionally, the computing device architecture 400 may be provided on any other type or form of computing devices, such as mobile devices (e.g., smartphones, tablet computers, or the like), desktop computers, laptop computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

As is shown in FIG. 4, components of the computing device architecture 400 may be in electrical communication with each other by way of a connection 405, e.g., a bus. The computing device architecture 400 shown in FIG. 4 includes a processor unit 410 (e.g., a CPU, a GPU, or another processor unit) coupled to various components of the computing device architecture 400, including but not limited to a set of memory components 415, e.g., a cache of high-speed memory connected directly with, in close proximity to, or integrated as part of the processor 410, such as read-only memory ("ROM") 420 and random-access memory ("RAM") 425. The processor unit 410 may be any general-purpose processor or a special-purpose processor, such as a self-contained system.

The computing device architecture 400 also includes a storage device 430 including one or more sets of data or instructions for performing various services 432-1, 432-2 . . . 432-*n*. The storage device 430 may be a non-volatile memory, a hard disk or another type of computer-readable media that may store data that is accessible to the computing device architecture 400 or other computers, such as magnetic cassettes, flash memory cards, solid state memory devices, digital versatile disks, cartridges, as well as the memory 415, e.g., the ROM 420, the RAM 425, and any others. One or more of the services 432-1, 432-2 . . . 432-*n* may be provided and executed for controlling the processor unit 410 or any other aspect of the computing device architecture 400.

The computing device architecture 400 further includes an input device 435, an output device 440 and a communications interface 445. The input device 435 enables interaction with the computing device architecture 400 and may represent any number of input mechanisms, e.g., a microphone for receiving sounds or speech signals, a touch-sensitive screen for receiving gestures or other manual inputs, or others. The output device 440 may represent any number of output mechanisms, e.g., a display, a projector, a television, a speaker device, or others. The communications interface 445 may be configured to govern or manage inputs received from users via the input device 435 and outputs to be provided to such users via the output device 440.

As used herein, the terms "device," "system" or "unit" need not be limited to any one or a specific number of physical objects (such as one smartphone, one controller, one processing system and so on), and may instead refer to any system having any number of parts that may implement any portions of the present disclosure. Likewise, the terms "device," "system" or "unit" are not limited to any configuration, type, or number of objects.

Devices implementing processes and methods according to these disclosures may include hardware, software, firmware, middleware, microcode, hardware description languages, or any combinations thereof, and may take any of a variety of form factors. When implemented in software, firmware, middleware, or microcode, the program code or code segments to perform the necessary tasks (e.g., a computer-program product) may be stored in a computer-readable or machine-readable medium.

Figure 5B:
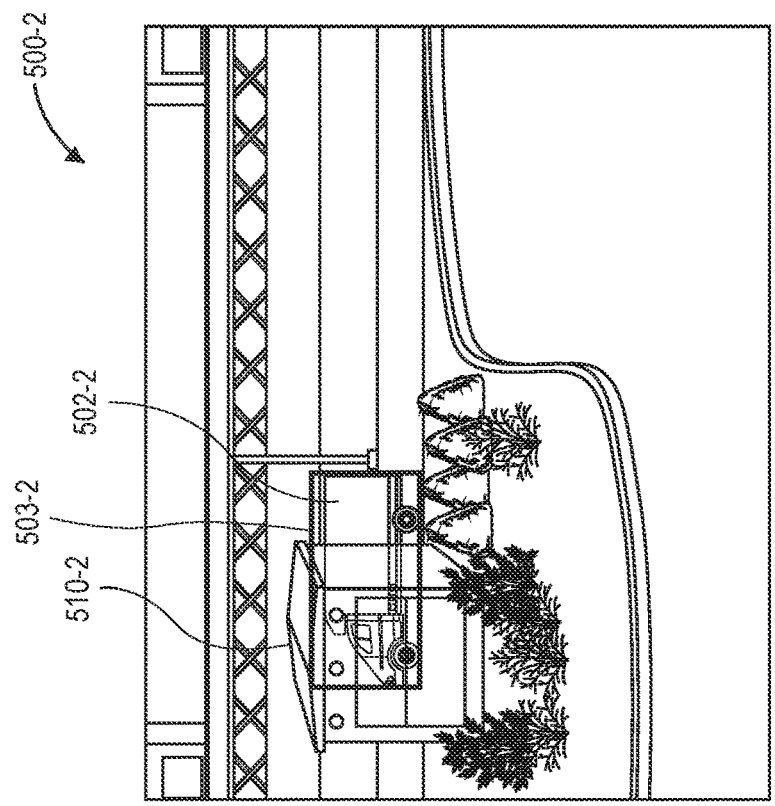
FIGS. 5A through 5C illustrate an example of enhanced video frames illustrating object tracking through an artifact, in accordance with disclosed implementations.
Figure 5A:
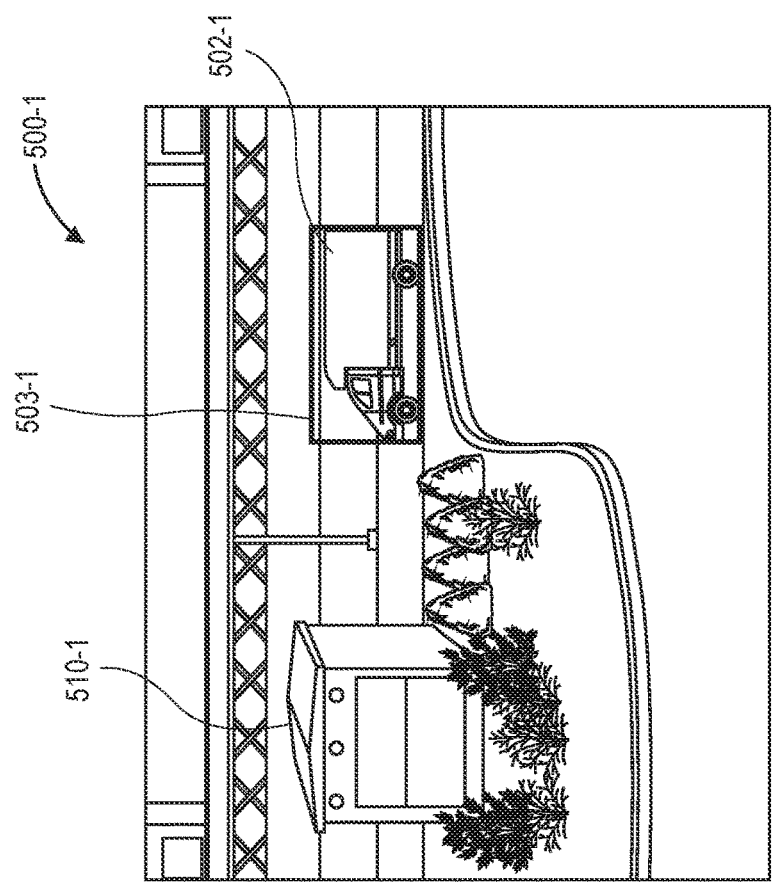
Figure 5C:
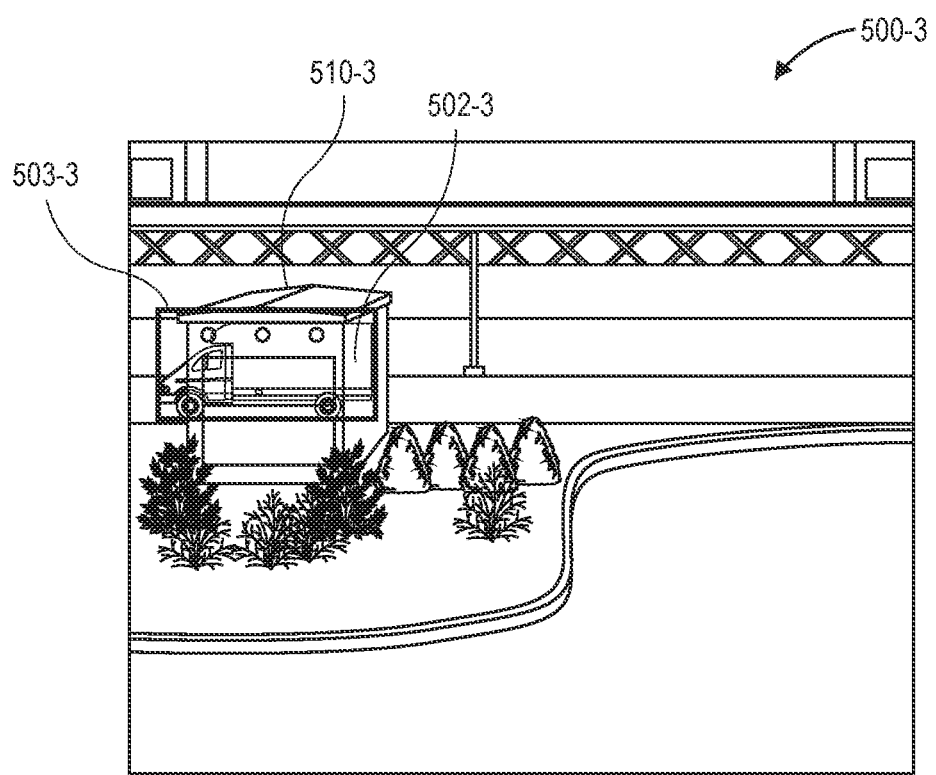

FIGS. 5A through 5C illustrate an example of enhanced video frames illustrating object tracking through an artifact, in accordance with disclosed implementations.

Turning first to FIG. 5A, illustrated is a first frame 500-1 representative of a scene recorded as video/video data by a camera, such as a camera at an edge location. In the frame 500-1 there is an object 502-1, in this example a delivery vehicle, that is being tracked, as illustrated by the bounding box 503-1, along with several artifacts, such as trees, bushes, and a structure 510-1. Any of a variety of object tracking models may be used to track the position of the object 502-1 as the object moves through the scene and is recorded in frames of the video. For example, any one or more of a Kalman filter, linear tracker, You Only Look Once ("YOLO") algorithm, a convolutional neural network ("CNN"), etc., may be used to detect and/or track objects in frames of a video.

In the first frame 500-1, it may be determined that the tracked object 502-1 is not obscured by an artifact and the unobscured frame may be stored and used, as discussed below, to train or refine a model, such as a diffusion model and/or AAM, to track or predict the position of the object as it moves through the scene. For example, the object may be segmented or extracted from the frame and used as training data to train or refine a model, such as a diffusion model and/or an AAM to track and/or predict the position of the object within the scene. In some implementations, multiple frames in which the object is unobscured by an artifact may be determined and some or all of the object represented in the frame, or the entire frame of the video, utilized as an unobscured object image that may be used to train or refine the model to track the object in the video.

Comparatively, referring to FIG. 5B, illustrated is the tracked object 502-2 as the object is tracked, illustrated by the bounding box 503-2, and passing behind an artifact 510-2. As discussed further below, with the disclosed implementations, as the object is tracked and moves through the scene, the appearance of the object is predicted for each frame of the video and the predicted appearance of the object may be used to both continue refinement of the model that tracks the object and also enhance the video data so that the tracked position of the object is visible in the video data. "Appearance," such as the appearance of an object or the appearance of an artifact, as used herein, includes, but it not limited to the pose, position, orientation, color values, shape, etc., of the object, artifact, etc. For example, and as illustrated in FIG. 5B, the appearance of the object, such as the position, pose, direction, etc., of the object 502-2 behind the artifact 510-2 is determined and frames of the video are enhanced to illustrate the object 502-2 as visible even as it passes behind the artifact 510-2. For example, frames of the video data may be enhanced such that the frames include a representation of the object 502-2 as if the artifact 510-2 were at least partially translucent, as if the artifact were transparent, etc., such that the object remains visible through the artifact. In some implementations, the enhanced frame(s) of the video may illustrate the object 502-2 in full color as if the object were visible. In other examples, the portion of the object that is obscured by an artifact may be presented as an outline, or otherwise illustrated so that the appearance of the object, even though actually obscured by the artifact, is discernable in the enhanced video.

As illustrated in FIG. 5C, as the object 502-3 continues past the artifact 510-3, and becomes visible again in the frame 503-3, the predicted appearance of the object 502-3 in the frame 503-3 is compared to the actual position in the frame 503-3 and the difference utilized to continue to refine the model that predicts the position of the object 502-3 within the scene recorded in the video. In addition, the predicted position of the object 502-3 within the frame 503-3 is used to enhance the frame, as discussed above with respect to FIG. 5B, and as discussed further below, to present the object as visible even though it is obscured by the artifact 510-3. While the example discussed with respect to FIGS. 5A through 5C illustrates the object as only partially obscured by an artifact, it will be appreciated that the disclosed implementations may also be used to track and predict an appearance of an object that is completely obscured by one or more objects of a scene and to generate enhanced video that illustrates an appearance of the object through the artifact even if the object is fully obscured by the artifact.

Figure 5D:
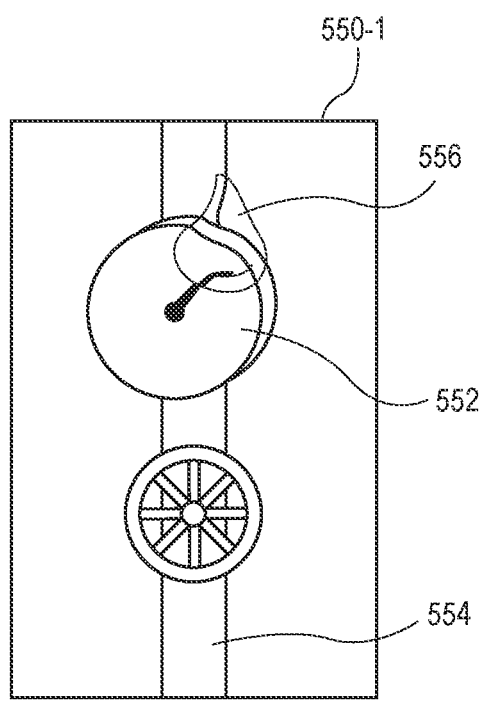
FIGS. 5D and 5E illustrate an example of an image with an artifact (FIG. 5D) and an enhanced image in which the artifact is removed (FIG. 5E), in accordance with disclosed implementations.
Figure 5E:
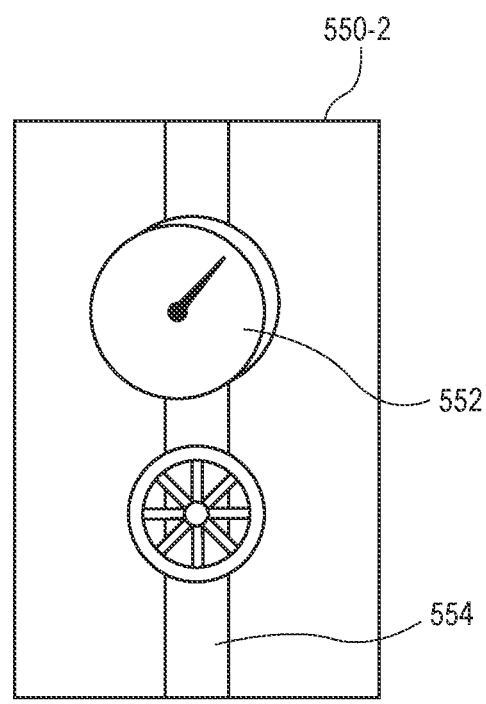

FIGS. 5D and 5E illustrate an example of an image with an artifact (FIG. 5D) and an enhanced image (FIG. 5E) in which the artifact is removed, in accordance with disclosed implementations.

Turning first to FIG. 5D, illustrated is an image 550-1 that includes a pressure gauge object 552 and a pipe 554. The image 550-1 illustrates a still image or a frame of a video in which an artifact 556 is obscuring at least a portion of the object 552 represented in the image 550-1. In the illustrated example, the artifact 556 is a water droplet on a lens of the imaging element that generated the image 550-1 that is causing a distortion in the image 550-1. With the disclosed implementations, the pixel values of the obscured object 552 are adjusted to produce an enhanced image 550-2, illustrated in FIG. 5E. In the example illustrated in FIG. 5E, the pixel values corresponding to the obscured portion of the object are adjusted to remove the deformation of the object 552 such that the artifact does not appear in the enhanced image 550-2. As discussed herein, in some implementations, the pixel values may be adjusted using the current pixel values but remove the deformation caused by the artifact. In other examples, the pixel values may be adjusted based on adjacent pixel values in the image and/or based on expected pixels values.

Figure 6:
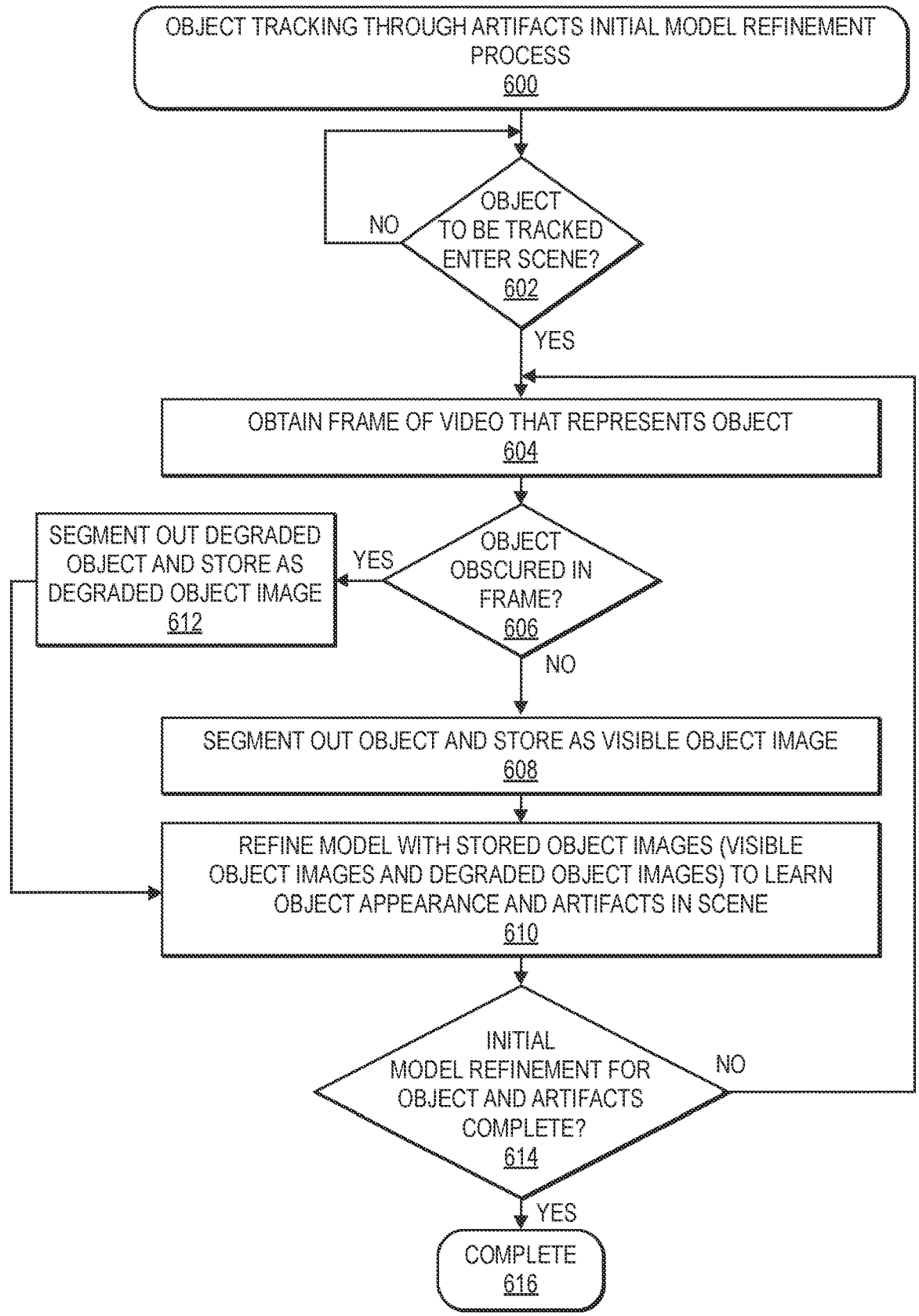
FIG. 6 illustrates an example object tracking through artifacts initial model refinement process, in accordance with disclosed implementations.

FIG. 6 illustrates an example object tracking through artifacts initial model refinement process 600, in accordance with disclosed implementations. The example process 600 may be performed for any number of objects to be tracked, continually refining a model to track any number of objects within a scene recorded in a video by a camera or other imaging element.

The example process 600 begins by determining if an object to be tracked is in the scene or present in a frame of the video that is recording the scene, as in 602. For example, as video data is generated, it may be processed by one or more image processing algorithms, models, or systems that have been trained to detect objects of interest. Those systems may have instructions for objects that are to be detected and tracked in a scene that is recorded in the video. For example, instructions to track all blue delivery vehicles may be provided to the example process 600 and the example process 600 may process frames of a video, as the frames are generated by a camera to determine if the object (e.g., blue delivery van) is present in the scene. In other examples, the object may be any of a variety of different objects. If it is determined that the object is not present, the example process 600 remains at decision block 602 and continues to process frames of the video, for example, as the frames are generated, until an object that is to be tracked by the example process 600 is detected in a frame of the video.

Upon determination that an object to be tracked is present in a frame of the video, the frame of the video that represents the object is obtained, as in 604. The frame may then be processed to determine if the object is partially or wholly obscured in the frame by an artifact, as in 606. For example, an expected or known shape and/or size of an object to be tracked may be known to the one or more systems or algorithms that initially process the image data, such as a YOLO algorithm, CNN, etc., and the image data may be processed to determine if that expected/known shape and/or size of the object is present or partially obscured in the frame of the video. As discussed above, an artifact may be another object, structure, substance, etc., in the scene that is between the object and the camera and/or may be an artifact (e.g., dirt, mud, ice, water, etc.) on a lens of the camera, etc.

If it is determined that the object is not partially or wholly obscured by an artifact, the object may be segmented from the frame and the pixels and corresponding pixel values of the segmented object stored as a visible object image, as in 608. Any of a plurality of background subtraction, object segmentation, or other image processing techniques may be utilized to segment the tracked object from the frame of the video.

If it is determined at decision block 606 that the tracked object is partially or wholly obscured by an artifact in the frame, a predicted appearance (position, orientation, pose, etc.) of the object in the frame is determined and the pixels and corresponding pixel values of the predicted appearance of the object are extracted from the frame and stored as a degraded object image, as in 612. In comparison to traditional systems that train a model, such as a diffusion model and/or AAM, by degrading images of an object, with the disclosed implementations, image degradation for model training/refinement is not needed as actual images from the scene when the object is partially or wholly obscured may be utilized as degraded images. This provides improvements over existing systems by not only increasing accuracy and eliminating the need to degrade images by using actual images from the scene, but the model may also be trained to not only predict the appearance of an object within the scene but to also learn the appearance of artifacts within the scene. Learning the appearance of artifacts within the scene may then be used to improve the accuracy of predicting the appearance of the object in the scene. Still further, if a second object is to be tracked in the scene, model refinement to refine the model to predict the appearance of the second object and track the second object is greatly reduced because the model already knows the appearance of at least some artifacts within the scene that may obscure the second object.

Returning to FIG. 6, after collecting one or more visible object images and one or more degraded object images, the model, such as a diffusion model and/or AAM, may be refined or trained using the visible object image(s) and degraded object image(s) to both learn object appearance of the object and the appearance of artifacts in the scene, as in 610.

After refining the model, a determination may be made as to whether initial model refinement for object and artifact determination is complete, as in 614. For example, a residual error or amount of refinement may be considered to determine if initial model refinement is complete. For example, if the residual does not further decrease or the amount of refinement stays within a defined or minimal refinement amount, it may be determined that initial refinement is complete.

If it is determined that initial model refinement is not complete, the example process 600 returns to block 604 and continues to collect visible object images and degraded object images of the object within the scene and continues to refine the model. If it is determined that initial model refinement is complete, the example process 600 completes, as in 616.

Figure 7:
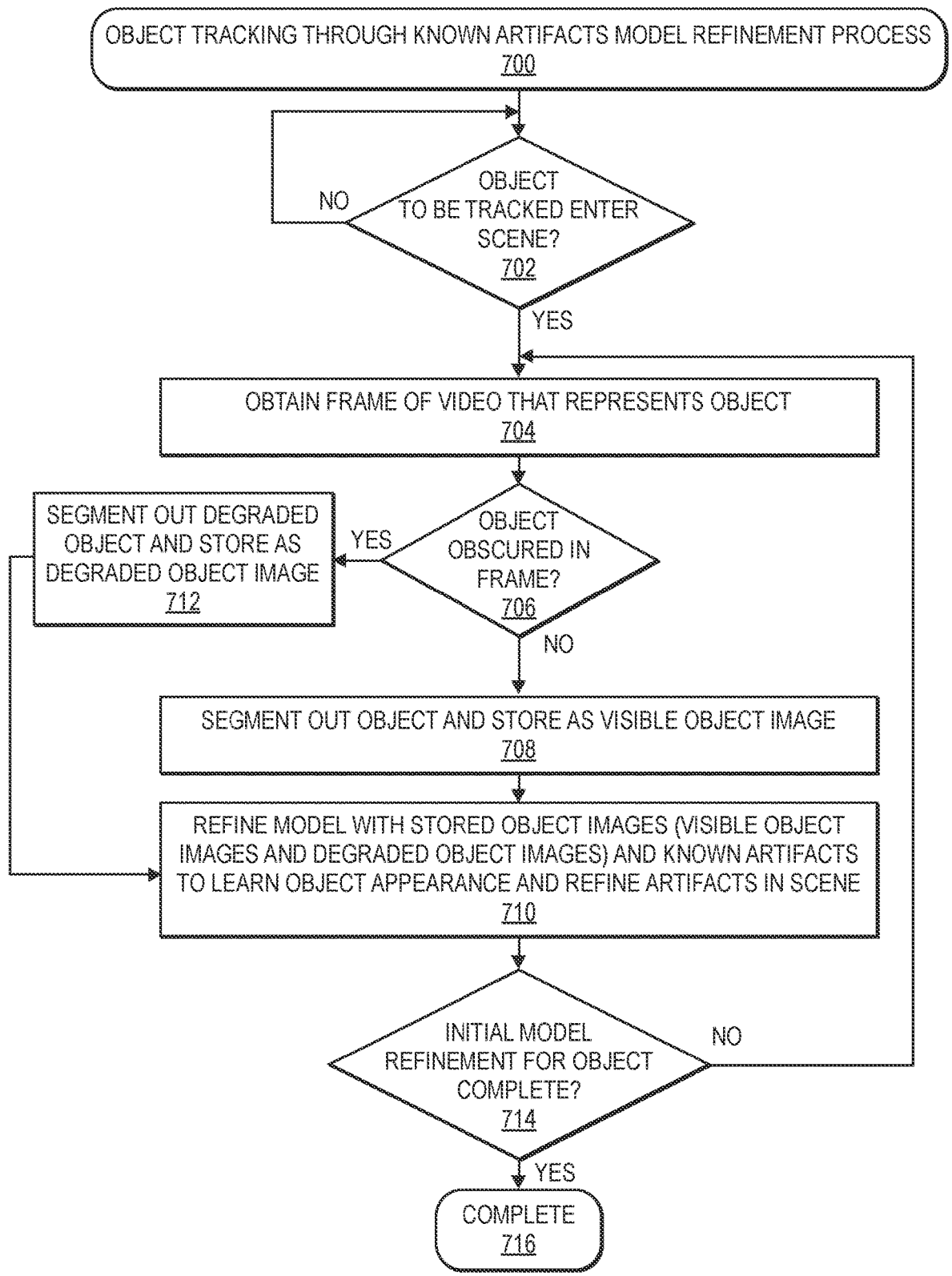
FIG. 7 illustrates an example object tracking through known artifacts model refinement process, in accordance with disclosed implementations.

FIG. 7 illustrates an example object tracking through known artifacts model refinement process 700, in accordance with disclosed implementations. The example process 700 may be performed when a second object is to be tracked in the scene and the model refinement process 600 (FIG. 6) has already been performed and the model refined/trained to track a first object and learn the appearance of at least some artifacts within the scene.

The example process 700 begins by determining if an object is to be tracked, such as a second object is in the scene or present in a frame of the video that is recording the scene, as in 702. For example, as video data is generated, it may be processed by one or more image processing algorithms, models, or systems that have been trained to detect objects of interest. Those systems may have instructions for objects that are to be detected and tracked in a scene that is recorded in the video. For example, instructions to track all blue delivery vehicles and all people in the scene may be provided to the example process 700 and the example process 700 may process frames of a video, as the frames are generated by a camera, to determine if one or both of the objects (e.g., blue delivery van or people) are present in the scene. In the discussion with respect to FIG. 7, the example process 700 may be performed after the example process 600 was performed to detect another object in the scene.

Upon determination that an object to be tracked is present in a frame of the video, the frame of the video that represents the object is obtained, as in 704. The frame may then be processed to determine if the object is partially or wholly obscured in the frame by an artifact, as in 706. As discussed above, an artifact may be another object, structure, substance, etc., in the scene that is between the object and the camera and/or may be an artifact (e.g., dirt, mud, ice, water, etc.) on a lens of the camera, etc.

If it is determined that the object is not partially or wholly obscured by an artifact, the object may be segmented from the frame and the pixels and corresponding pixel values of the segmented object stored as a visible object image, as in 708. Any of a plurality of background subtraction, object segmentation, or other image processing techniques may be utilized to segment the tracked object from the frame of the video.

If it is determined at decision block 706 that the tracked object is partially or wholly obscured by an artifact in the frame, a predicted appearance (position, orientation, pose, etc.) of the object in the frame is determined and the pixels and corresponding pixel values of the predicted appearance of the object extracted from the frame and stored as a degraded object image, as in 712. In the example discussed with respect to FIG. 7, the prediction may be enhanced or improved based on the knowledge of the model as to the appearance of at least some of the artifacts in the scene, as determined during prior refinement and object tracking within the scene. For example, if the object is partially obscured by an artifact within the scene whose appearance is known to the model, such information may be utilized in predicting the appearance of the object with respect to the artifact.

Returning to FIG. 7, after collecting one or more visible object images and one or more degraded object images, the model, such as a diffusion model and/or AAM, may be refined or trained using the visible object image(s) and degraded object image(s) to learn object appearance of the object and to possibly refine or further tune the model with respect to artifacts in the scene, as in 710.

After refining the model, a determination may be made as to whether initial model refinement for object appearance determination is complete, as in 714. If it is determined that initial model refinement is not complete, the example process 700 returns to block 704 and continues to collect visible object images and degraded object images of the object within the scene and continues to refine the model. If it is determined that initial model refinement is complete, the example process 700 completes, as in 716.

Figure 8:
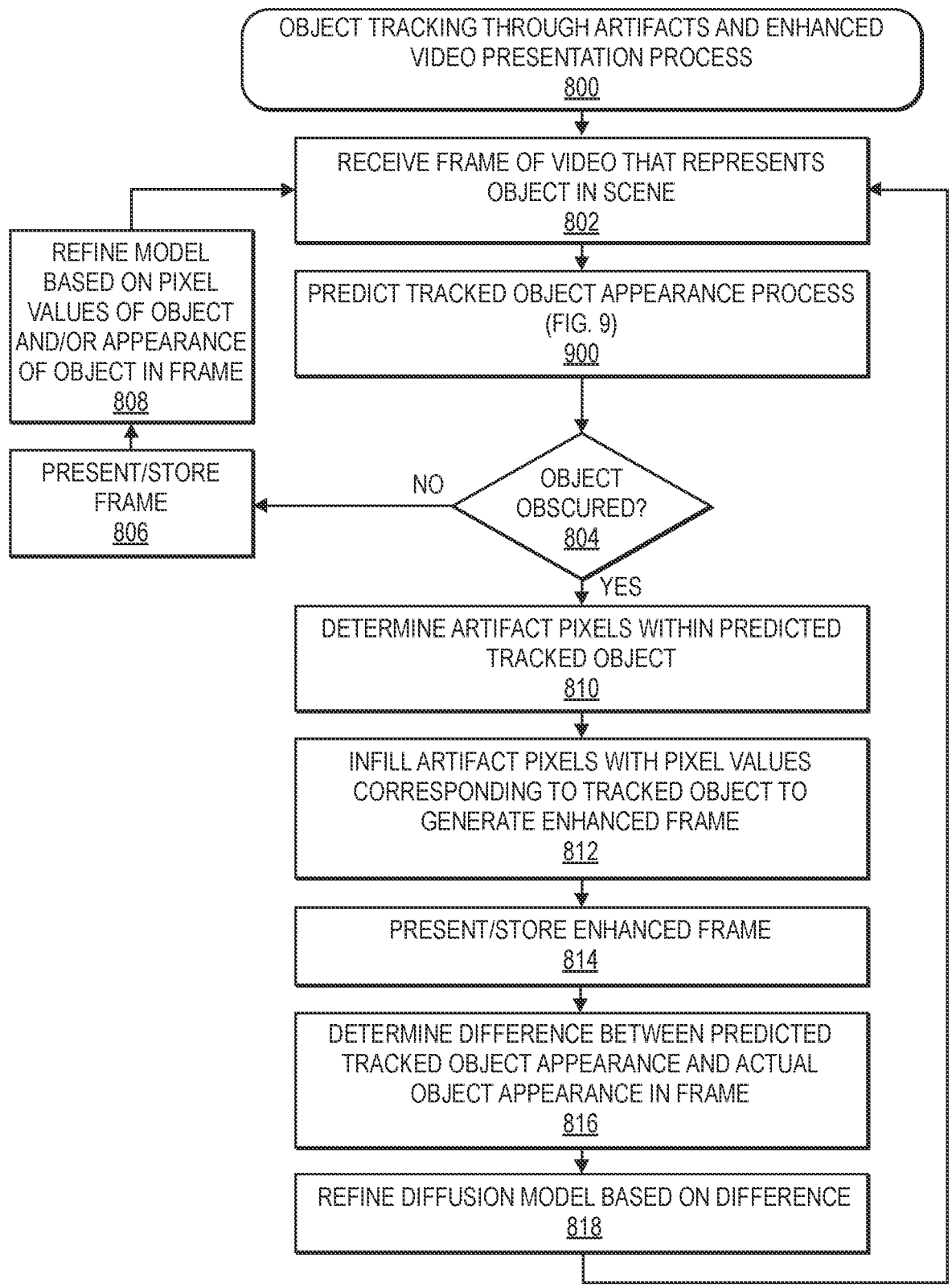
FIG. 8 illustrates an example object tracking through artifacts and enhanced video presentation process, in accordance with disclosed implementations.

FIGS. 8A and 8B illustrate an example object tracking through artifacts and enhanced video presentation process 800, in accordance with disclosed implementations.

Figure 9:
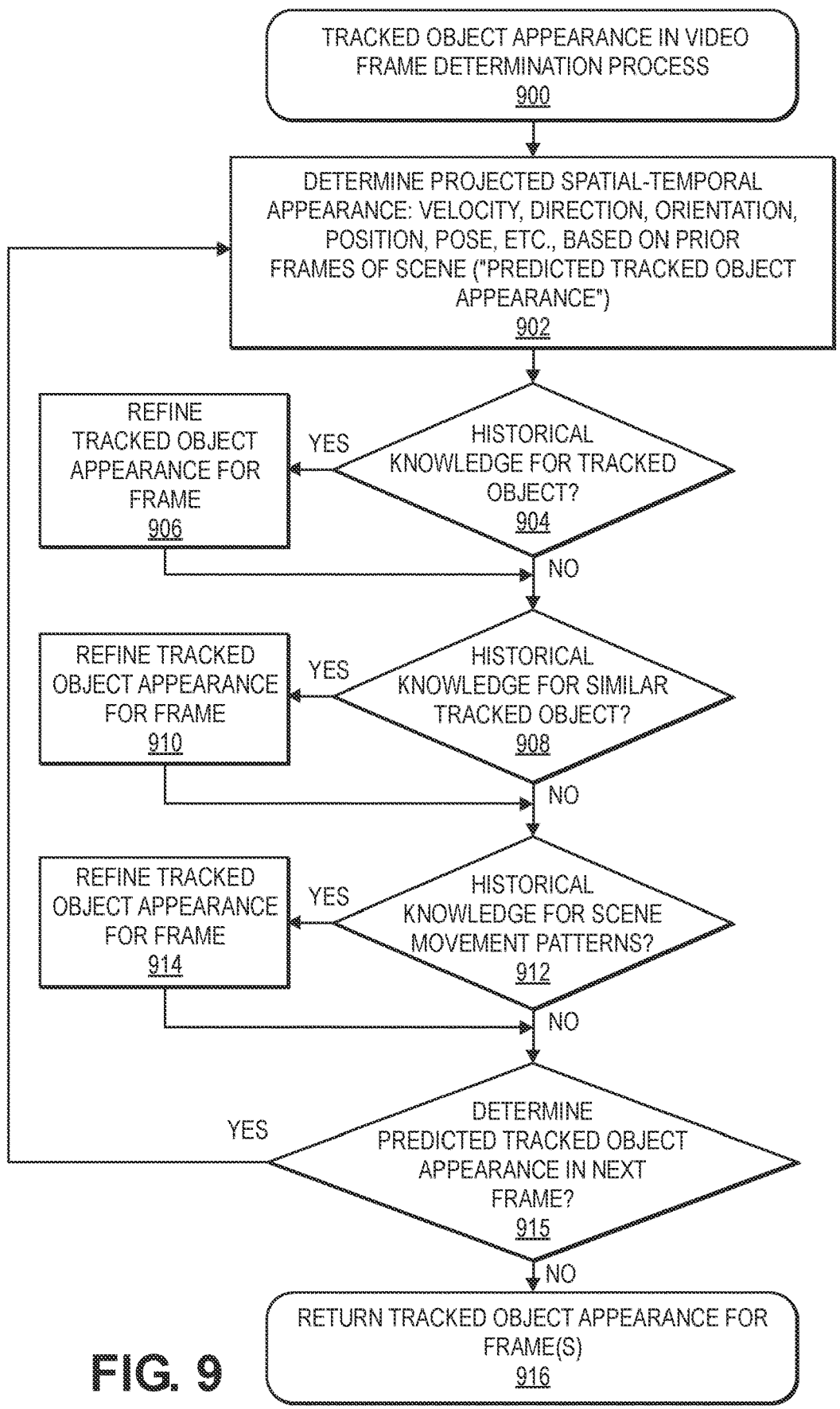
FIG. 9 illustrates an example tracked object appearance in video frame determination process, in accordance with disclosed implementations.

The example process 800 begins by receiving a frame of a video that represents an object that is to be tracked within a scene, as in 802. For the frame, a tracked object position is predicted or obtained from a previously determined predicted position of that object for the frame, as in 900 (FIG. 9). For example, as discussed further below, the example process 900 may predict a tracked object position for N number of future frames. As the example process 800 continues through multiple frames, the predicted position of a future frame, which is now the current frame received by the example process 800, may be determined from the example process 900.

A determination may then be made as to whether the object is partially or wholly obscured by an artifact, as in 804. If it is determined that the object is not obscured, the frame may be presented and/or stored, as in 806. Still further, the model, such as a diffusion model and/or AAM may be refined based on, for example, the pixel values of the object represented in the frame, as in 808. For example, pixel values for pixels representative of the object may be determined and periodically updated within the model to account for changes in lighting within the scene (e.g., as the day progresses) so that enhancement of frames to represent the object are accurate. In some implementations, pixel values for the object may be updated on a rolling window and may be maintained for different determined appearances (orientations, poses, positions, etc.) of the object such that when the object is at least partially obscured and the frame enhanced such that the object is visible through artifacts, as discussed herein, the pixel values assigned to the obscured portion of the object are visually accurate. In addition, as discussed below, for each frame in which the object is not obscured, a difference between the actual position of the object within the frame and a previously predicted position of the object for that frame may be determined and further utilized to refine or tune the model. As such, model refinement and tuning may continue on a continuous or periodic basis as objects are tracked within a scene by the model. After refining the model at block 808, the example process 800 returns to block 802 and continues.

If it is determined at decision block 804 that the object is at least partially obscured, artifact pixels within a predicted position of the object for the frame are determined, as in 810. As discussed below, the example process 900, during a processing of a prior frame of the video may determine a predicted position of the object for the current frame and artifact pixels corresponding to the predicted position of the object may be determined, as in block 810.

The determined artifact pixels may then be infilled with pixel values corresponding to the predicted appearance of the tracked object to generate an enhanced frame that illustrates the object as visible through the artifact, as in 812. Any of a variety of infilling may be performed with the disclosed implementations. For example, infilling may use pixel values that illustrate the object as an outline or silhouette that is visible through the artifact and/or to illustrate the artifact as an outline or silhouette such that the object is visible through the artifact. In another example, the infilling may illustrate the obscured portion of the object as if the artifact is at least partially translucent and/or an outline of the artifact. In another example, the infilling may illustrate the obscured portion of the object as if the artifact is at least partially transparent. In still another example, the infilling may represent the object as if the artifact were not present in the scene. As will be appreciated, other infilling techniques or styles may be used to illustrate an appearance of a tracked object that is at least partially obscured by an artifact. In some implementations, pixel values for infilling may be determined from adjacent or surrounding pixel values, based on expected or known pixel values, etc. In other examples, infilling may use the existing pixel values but adjust the appearance of the image (e.g., de-warping or de-skewing) the appearance from an artifact (such as water on a lens of the imaging element).

The enhanced frame may then be presented and/or stored as if part of the original video of the scene, as in 814.

In addition, a difference between a predicted appearance of the object in the frame, as previously determined by the example process 900 when processing a prior frame, and an actual position of the object in the frame may be determined, as in 816, and the different utilized to continue to refine the model, as in 818. After refining the model, the example process 800 returns to block 802 and continues.

FIG. 9 illustrates an example tracked object appearance in video frame determination process 900, in accordance with disclosed implementations. The example process may be performed to determine an actual appearance (position, pose, orientation, etc.) of an object in a current frame as well as to predict an object appearance of the object in N number of future frames.

The example process 900 begins by determining a projected spatial-temporal appearance of the object, as in 902. The spatial-temporal appearance for an object may include, but is not limited to, any one or more of a velocity of the object, a direction of travel of the object, an orientation of the object, a position of the object, a pose of the object, etc. The spatial-temporal appearance of the object for a frame may be determined based on the predicted and/or known spatial-temporal appearance of the object in prior frames of the video. For example, the velocity, orientation, position, pose, etc., of the object for a frame can be determined based at least in part on the actual velocity of the object as determined in prior frames of the video.

A determination may then be made as to whether there is any historical knowledge of the tracked object, as in 904. Historical knowledge can be, for example, prior tracking of the object through the scene, prior tracking of the object through certain portions of the scene, etc., in addition to the prior frames of the current video. If it is determined that there is prior knowledge of the object, the tracked object appearance determined for the object may be refined based on that prior knowledge, as in 906. In some implementations, refinement of the tracked object appearance based on historical knowledge of the object may only be performed if a portion of the object is obscured by an artifact in the frame.

After refining the tracked object appearance based on historical knowledge of the object, or if it is determined that there is no historical knowledge for the object, it may be determined whether there is historical knowledge for similar tracked objects, as in 908. Similar tracked objects may be, for example, objects of a same type. For example, if the currently tracked object is a blue delivery van, a similar object may be a white delivery van, a passenger vehicle, etc. If it is determined that there is prior knowledge for a similar object, the tracked object appearance determined for the object may be refined based on that prior knowledge of a similar object, as in 910. In some implementations, refinement of the tracked object appearance based on historical knowledge of a similar object may only be performed if a portion of the object is obscured by an artifact in the frame and/or if it is determined that there is no historical knowledge for the tracked object.

After refining the tracked object appearance based on historical knowledge of a similar object, or if it is determined that there is no historical knowledge for a similar object, it may be determined whether there is historical knowledge for scene movement patterns, as in 912. Scene movement patterns may be determined for a scene based on, for example, an aggregate of movements of other tracked objects through the scene. For example, other tracked objects may typically progress through the scene in a similar pattern. In such an example, scene movement patterns may be determined for the scene. If it is determined that there are historical scene movement patterns for the scene, the tracked object appearance determined for the object may be refined based on that prior knowledge of scene movement patterns, as in 914. In some implementations, refinement of the tracked object appearance based on historical scene movement patterns may only be performed if a portion of the object is obscured by an artifact in the frame, if it is determined that there is no historical knowledge for the tracked object, and/or if it is determined that there is no historical knowledge for similar tracked objects.

After refining the tracked object appearance based on historical scene movement patterns, or if it is determined that there are no historical scene movement patterns, it may be determined whether a predicted tracked object appearance for the object is to be determined for a next frame (also referred to herein as a future frame), as in 915. If it is determined that a predicted tracked object appearance is to be determined for a next frame, the example process returns to block 902 and continues. If it is determined that a tracked object appearance is not to be determined for a next frame, the example process 900 completes, as in 916, and returns the tracked object appearance determined for the frame(s).

Figure 10:
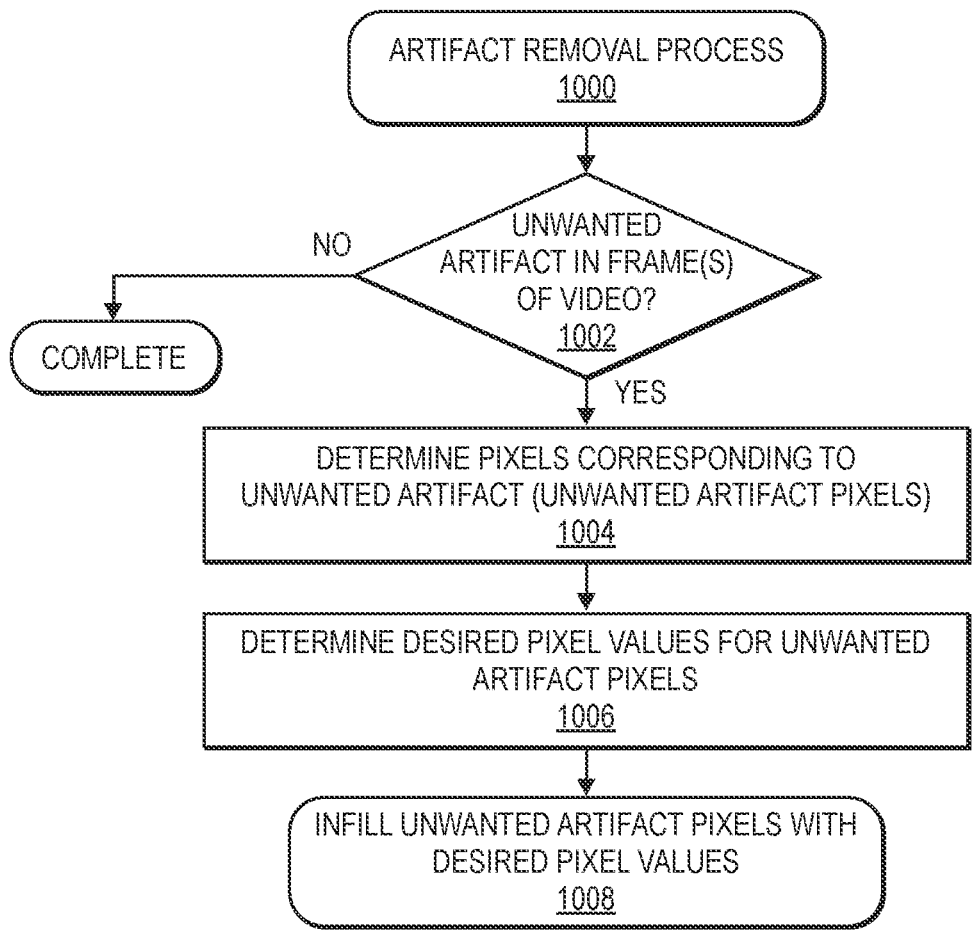
FIG. 10 illustrates an example artifact removal process, in accordance with disclosed implementations.

FIG. 10 illustrates an example artifact removal process 1000, in accordance with disclosed implementations. The example process 1000 may be performed to remove obscurities presented in multiple frames of a video due to an artifact in the scene, such as foreign material (mud, dirt, water, ice, etc.) on a lens of the camera that generates video of the scene.

The example process 1000 begins by determining if there is an unwanted artifact that is causing obscurities in multiple frames of the video, as in 1002. A variety of techniques may be used to determine if there is an unwanted artifact. For example, pixel values from frames of the scene in the video may be compared to corresponding pixel values from prior frames of the scene in the video or compared to pixel values of frames of the scene from other videos generated by the camera that are known to not have unwanted artifacts. In another example, adjacent pixel values within a frame may be compared to determine unexpected pixel value changes that may be indicative of obscurities caused by an unwanted artifact.

If it is determined that there is not an unwanted artifact in frames of the video, the example process 1000 completes, as in 1008. If it is determined that there are unwanted artifacts in frames of the video, pixels of the frames corresponding to obscurities caused by the unwanted artifact are determined, referred to herein as unwanted artifact pixels, as in 1004. Similar to determining if there is an unwanted artifact, unwanted artifact pixels may be determined by comparing pixel values of the current frame(s) of the video with prior frames of the video and/or frames of another video of the scene that are known to not have the unwanted artifact to determine pixel values that are representative of obscurities caused in the frames due to the unwanted artifact.

In addition to determining unwanted artifact pixels, desired pixel values for the unwanted artifact pixels may be determined, as in 1006. For example, desired pixel values for the unwanted artifact pixels may be determined from prior frames of the video that are known to not include obscurities due to the artifact, may be determined from pixels of frame of another video of the scene generated by the camera that are known to not include obscurities from the artifact, etc. In other examples, pixels values of pixels adjacent the unwanted artifact pixels may be determined and used to determine desired pixel values for the unwanted artifact pixels. In still other examples, infilling may use the existing pixel values but adjust the appearance of the image (e.g., de-warping or de-skewing) the appearance from an artifact (such as water on a lens of the imaging element).

Finally, the unwanted artifact pixels may be infilled with the determined desired pixel values to generate an enhanced frame(s) of the video that removes the presentation of the obscurities caused by the unwanted artifact, as in 1008. The enhanced frame(s) may be stored and/or presented as part of the video.

Although some embodiments of the present disclosure show the use of edge computing units in support of operations in one or more industrial applications or functions, those of ordinary skill in the pertinent arts will realize that the systems and methods of the present disclosure are not so limited. Rather, the systems and methods of the present disclosure may be utilized in connection with any operations, and in support of any type of application or function.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures may indicate the same or similar items or features.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, a storage medium can be integral to a processor, and can be volatile or non-volatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method, comprising:
    detecting, in a scene of a video, a first object to be tracked;
    tracking, with a model, the first object as the first object moves through the scene;
    determining, as part of the tracking of the first object, a first plurality of frames of the video that includes an unobscured representation of the first object;
    segmenting, from each of the first plurality of frames, pixels representative of the first object;
    storing, for each of the first plurality of frames, the pixels representative of the first object as visible object images;
    determining, as part of the tracking of the first object, a second plurality of frames of the video that includes an obscured representation of the first object by an artifact;
    segmenting, from each of the second plurality of frames, pixels representative of the first object and pixels representative of the obscured representation of the first object;
    storing, for each of the second plurality of frames, the pixels representative of the first object and the pixels representative of the obscured representation of the first object as degraded object images;
    refining, as the first object is tracked by the model and using the visible object images and the degraded object images, the model to at least learn an appearance of the artifact in the scene that obscures the first object in the second plurality of frames, wherein the appearance of the artifact includes at least a position, a size, and a shape of the artifact in the scene; and
    subsequent to the refining:
        detecting, in the scene of the video, a second object to be tracked;
        tracking, with the refined model, the second object in the video as the second object moves within the scene;
        determining a predicted tracked object appearance of the second object in a future frame of the video;
        determining, with the model and based on the learned appearance of the artifact, that at least a portion of the predicted tracked object appearance of the second object in the future frame is at least partially obscured by the learned appearance of the artifact;
        infilling artifact pixels of the learned appearance of the artifact in the scene with pixel values corresponding to the predicted tracked object appearance of the second object to generate an enhanced frame that illustrates the second object as at least partially visible through the learned appearance of the artifact in the scene; and
        presenting the enhanced frame.

2. The computer-implemented method of claim 1, further comprising:
    determining at least one of a predicted position or a predicted pose of a portion of the first object obscured by the artifact;
    determining a difference between at least one of the predicted position or the predicted pose and a determined actual position or an actual pose of the first object; and
    refining the model based at least in part on the difference.

3. The computer-implemented method of claim 2, wherein:
    determining at least one of the predicted position or the predicted pose is for a next frame of the video.

4. The computer-implemented method of claim 1, further comprising:
    determining, for a frame of the video, a predicted appearance of the first object; and
    refining the predicted appearance based on at least one of a first historical knowledge of the first object, a second historical knowledge of a similar object that is determined to be similar to the first object, or a historical knowledge of a movement pattern of objects within the scene.

5. The computer-implemented method of claim 1, wherein infilling the artifact pixels includes:
    infilling the artifact pixels with pixel values such that the illustration of the second object in the enhanced frame is at least a silhouette of the portion of the second object obscured by the artifact.

6. The computer-implemented method of claim 1, wherein the artifact is at least one of a physical object in the scene or an object on a lens of a camera that generated the video.

7. A computing system, comprising:
    one or more processors; and
    a memory storing program instructions that, when executed by the one or more processors, cause the one or more processors to at least:
        track, with a model, a first object represented in a scene of a video;
        determine that at least a portion of the first object represented in a frame of the video is obscured by an artifact;
        determine, for a first plurality of pixels of the frame that correspond to at least the portion of the first object that is obscured, an appearance of the artifact;
        refine, as the first object is tracked and using the first plurality of pixels, the model, to at least learn the appearance of the artifact in the scene, wherein the appearance of the artifact includes at least a position, a size, and a shape of the artifact in the scene; and
        subsequent to the refinement:
            detect, in the scene of the video, a second object to be tracked;
            track, with the refined model, the second object in the video as the second object moves within the scene;
            determine a predicted tracked object appearance of the second object in a future frame of the video;
            determine, with the model and based on the learned appearance of the artifact, that at least a portion of the predicted tracked object appearance of the second object in the future frame is at least partially obscured by the learned appearance of the artifact;
            infill artifact pixels of the learned appearance of the artifact in the scene with pixel values corresponding to the predicted tracked object appearance of the second object to generate an enhanced frame that illustrates the second object as at least partially visible through the learned appearance of the artifact; and
            at least one of present the enhanced frame or store in the memory the enhanced frame.

8. The computing system of claim 7, wherein the program instructions that, when executed by the one or more processors, further cause the one or more processors to at least:

determine, for at least a next frame in a plurality of frames of the video, a predicted position of the first object;

determine a difference between the predicted position of the first object and an actual position of the first object when the next frame is generated; and update the model based at least in a part on the difference.

9. The computing system of claim 7, wherein:

the model is at least one of a diffusion model or an active appearance model; and the model is updated during a tracking of the first object.

10. The computing system of claim 7, wherein the program instructions that, when executed by the one or more processors, further cause the one or more processors to at least:

determine a first plurality of frames of the video that includes an unobscured representation of the first object;

segment, from each of the first plurality of frames, pixels representative of the first object to generate a silhouette of the first object;

storing, for each of the first plurality of frames, the silhouette of the first object as visible object images;

determine a second plurality of frames of the video that includes an obscured representation of the first object;

segment, from each of the second plurality of frames, pixels representative of the first object and pixels representative of the obscured representation of the first object to generate a degraded silhouette of the first object;

store, for each of the second plurality of frames, the degraded silhouette as degraded object images; and refine, with the visible object images and the degraded object images, the model to learn an object appearance of the first object and the appearance of the artifact in the scene.

11. The computing system of claim 7, wherein the program instructions that, when executed by the one or more processors, further cause the one or more processors to at least:

determine, for a frame of the video, a predicted object appearance of the first object; and refine the predicted object appearance based on at least one of a first historical knowledge of the first object, a second historical knowledge of a similar object that is determined to be similar to the first object, or a historical knowledge of a movement pattern of objects within the scene.

12. The computing system of claim 7, wherein the program instructions that, when executed by the one or more processors, further cause the one or more processors to at least:

as the appearance of the first object is determined in the scene, determine appearances of each of a plurality of artifacts in the scene, wherein the artifact is included in the plurality of artifacts; and update the model with the appearance of each of the plurality of artifacts in the scene.

13. The computing system of claim 7, wherein the program instructions that, when executed by the one or more processors, further cause the one or more processors to at least:

refine the model to predict at least one of a first position or a first pose of the first object while the first object is in the scene; and refine the model to determine at least one of a second position or a second pose of the artifact in the scene.

14. The computing system of claim 13, wherein the model uses the determined at least one of the second position or the second pose of the artifact to predict at least one of a third position or a third pose of the second object when the second object is at least partially obscured by the artifact.

15. The computing system of claim 14, wherein the program instructions that, when executed by the one or more processors, further cause the one or more processors to at least:

periodically refine the model as objects are detected within the scene.

16. The computing system of claim 7, wherein the artifact is present on a lens of a camera generating the video.

17. A method, comprising:

determining that a first object is unobscured in a first frame of a video of a scene;

determining that the first object is obscured by an artifact in a second frame of the video of the scene;

refining, based at least in part on data from the first frame and data from the second frame, a model to at least learn an appearance of the artifact in the scene, wherein the appearance of the artifact includes at least a position, a size, and a shape of the artifact in the scene; and subsequent to refining:

tracking, with the refined model, a second object in the video as the second object moves within the scene;

determining a predicted tracked object appearance of the second object in a future frame of the video;

determining, with the model and based on the learned appearance of the artifact, that at least a portion of the predicted tracked object appearance of the second object in the future frame is obscured by the learned representation of the artifact;

infilling artifact pixels of the learned appearance of the artifact in the scene to generate an enhanced frame that illustrates at least the portion of the second object as at least partially visible through the learned appearance of the artifact in the scene; and presenting the enhanced frame as part of the video of the scene.

18. The method of claim 17, wherein the infilling includes:

infilling artifact pixels with pixel values so that at least the portion of the second object that is obscured is presented in the enhanced frame as at least one of:

an outline of at least the portion of the second object obscured by the learned appearance of the artifact in the scene;

an outline of at least a portion of the learned appearance of the artifact in the scene;

a presentation of at least the portion of the second object as if the artifact is at least partially translucent;

a presentation of at least the portion of the second object as if the artifact is at least partially transparent; or a presentation of at least the portion of the second object as if the artifact is not present at the learned appearance of the artifact in the scene.

19. The method of claim 17 further comprising:

infilling artifact pixels in each frame of a plurality of frames of the video with a third plurality of pixel values corresponding to a third plurality of pixels of the scene to remove an appearance of the artifact in each frame of the plurality of frames.

20. The method of claim 17, further comprising:
for each frame of a plurality of frames of the video:
   determining a predicted position of the first object; and
   determining a difference between the predicted position and an actual position of the first object in the frame; and
periodically refining the model based on the difference.

* * * * *